US011197164B2

(12) United States Patent
Vanka et al.

(10) Patent No.: US 11,197,164 B2
(45) Date of Patent: *Dec. 7, 2021

(54) PROTOCOLS FOR FLEXIBLE CHANNEL UTILIZATION

(71) Applicant: Avago Technologies International Sales Pte. Limited, Singapore (SG)

(72) Inventors: Sundaram Vanka, San Jose, CA (US); Matthew J. Fischer, San Jose, CA (US); Rohit Gaikwad, San Diego, CA (US); Vinko Erceg, San Diego, CA (US); Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 7 days.

This patent is subject to a terminal disclaimer.

(21) Appl. No.: 16/592,604

(22) Filed: Oct. 3, 2019

(65) Prior Publication Data
US 2020/0037171 A1 Jan. 30, 2020

Related U.S. Application Data

(63) Continuation of application No. 15/951,771, filed on Apr. 12, 2018, now Pat. No. 10,506,446.
(Continued)

(51) Int. Cl.
*H04W 16/14* (2009.01)
*H04W 16/02* (2009.01)
(Continued)

(52) U.S. Cl.
CPC .......... *H04W 16/14* (2013.01); *H04W 16/02* (2013.01); *H04W 16/10* (2013.01); *H04W 48/08* (2013.01);
(Continued)

(58) Field of Classification Search
CPC ...... H04L 63/205; H04L 69/24; H04W 16/02; H04W 16/10; H04W 16/14; H04W 48/08;
(Continued)

(56) References Cited

U.S. PATENT DOCUMENTS

2007/0070937 A1 3/2007 Demirhan et al.
2011/0194542 A1* 8/2011 Kim .................. H04W 74/0816
370/338
(Continued)

FOREIGN PATENT DOCUMENTS

CN 101208923 A 6/2008
CN 102469462 A 5/2012
CN 104025647 A 9/2014

OTHER PUBLICATIONS

Non-Final Office Action on U.S. Appl. No. 15/951,771 dated Apr. 4, 2019.
(Continued)

Primary Examiner — Melanie Jagannathan
(74) Attorney, Agent, or Firm — Foley & Lardner LLP

(57) ABSTRACT

In some aspects, the disclosure is directed to methods and systems for utilizing protocols to enable two 802.11 devices to exchange their dynamically-changing local channel availability table and form a mutual channel availability table with time, frequency, and transmission rate domains available. This table may be used to make optimum opportunistic use of link resources by adapting packet duration, frequency utilization and transmission rate to channel conditions.

20 Claims, 23 Drawing Sheets
(16 of 23 Drawing Sheet(s) Filed in Color)

Related U.S. Application Data

(60) Provisional application No. 62/577,689, filed on Oct. 26, 2017.

(51) Int. Cl.
| | |
|---|---|
| *H04W 16/10* | (2009.01) |
| *H04W 72/04* | (2009.01) |
| *H04W 76/15* | (2018.01) |
| *H04W 48/08* | (2009.01) |
| *H04W 48/16* | (2009.01) |
| *H04W 74/08* | (2009.01) |
| *H04W 84/12* | (2009.01) |

(52) U.S. Cl.
CPC ........ *H04W 48/16* (2013.01); *H04W 72/0426* (2013.01); *H04W 74/0816* (2013.01); *H04W 76/15* (2018.02); *H04W 84/12* (2013.01)

(58) Field of Classification Search
CPC .. H04W 48/16; H04W 74/0816; H04W 76/15
See application file for complete search history.

(56) References Cited

U.S. PATENT DOCUMENTS

| | | | |
|---|---|---|---|
| 2012/0258749 | A1 | 10/2012 | Lenzini et al. |
| 2013/0143613 | A1* | 6/2013 | Lee ..................... H04W 72/044 455/509 |
| 2014/0092860 | A1 | 4/2014 | Kneckt et al. |
| 2015/0139115 | A1* | 5/2015 | Seok ..................... H04W 28/20 370/329 |
| 2017/0094651 | A1 | 3/2017 | Green et al. |
| 2018/0098336 | A1 | 4/2018 | Alpert |
| 2018/0279130 | A1 | 9/2018 | Huang et al. |
| 2019/0082447 | A1 | 3/2019 | Harsha et al. |

OTHER PUBLICATIONS

Notice of Allowance on U.S. Appl. No. 15/951,771 dated Jul. 30, 2019.

Yang, Ming et al., "Dynamic Channel Partitioning With Flexible Channel Combination," IEEE Transactions on Wireless Communications, vol. 4, No. 5.

Notice of Allowance on U.S. Appl. No. 16/592,592 dated Mar. 26, 2021.

\* cited by examiner

| RU Size | N(SD,SHORT) | |
|---|---|---|
| | DCM = 0 | DCM = 1 |
| 26-tone | 6 | 2 |
| 52-tone | 12 | 6 |
| 106-tone | 24 | 12 |
| 242-tone | 60 | 30 |
| 484-tone | 120 | 60 |
| 996-tone | 240 | 120 |
| 2x996-tone | 492 | 246 |

*FIG. 8A*

PROTOCOLS FOR FLEXIBLE CHANNEL UTILIZATION

RELATED APPLICATIONS

The present application claims the benefit of and priority as a continuation to U.S. Nonprovisional patent application Ser. No. 15/951,771, entitled "Protocols for Flexible Channel Utilization," filed Apr. 12, 2018; which claims priority to U.S. Provisional Patent Application No. 62/577,689, entitled "Protocols for Flexible Channel Utilization," filed Oct. 26, 2017, the entirety of each of which is incorporated by reference herein.

FIELD OF THE DISCLOSURE

This disclosure generally relates to systems and methods for wireless communications. In particular, this disclosure relates to systems and methods for providing flexible channel utilization.

BACKGROUND OF THE DISCLOSURE

Devices utilizing the IEEE 802.11 standard protocols (sometimes referred to as "802.11 devices" or "WiFi devices") typically operate on unlicensed spectrum that is shared with other 802.11 devices in what are often unplanned deployments. The spectrum may also be shared with other wireless technologies that operate on this unlicensed spectrum and may be co-located with the 802.11 device, possibly sharing resources such as antennas or radios. For example, the Bluetooth protocol and License-Assisted Access (LAA) on handsets may use these resources. The spectrum may also be shared with higher priority or "preferential" users of spectrum that 802.11 devices must detect and defer to, such as military or aviation radar systems. The spectrum may also be inundated with noise from electromagnetic emissions that may spectrally overlap with the current 802.11 channel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8A is a table of pre-FEC padding values, according to one implementation;

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for providing flexible channel utilization; and Section B describes a network environment and computing environment which may be useful for practicing embodiments described herein.

A. Protocols for Flexible Channel Utilization

Figure 1A:
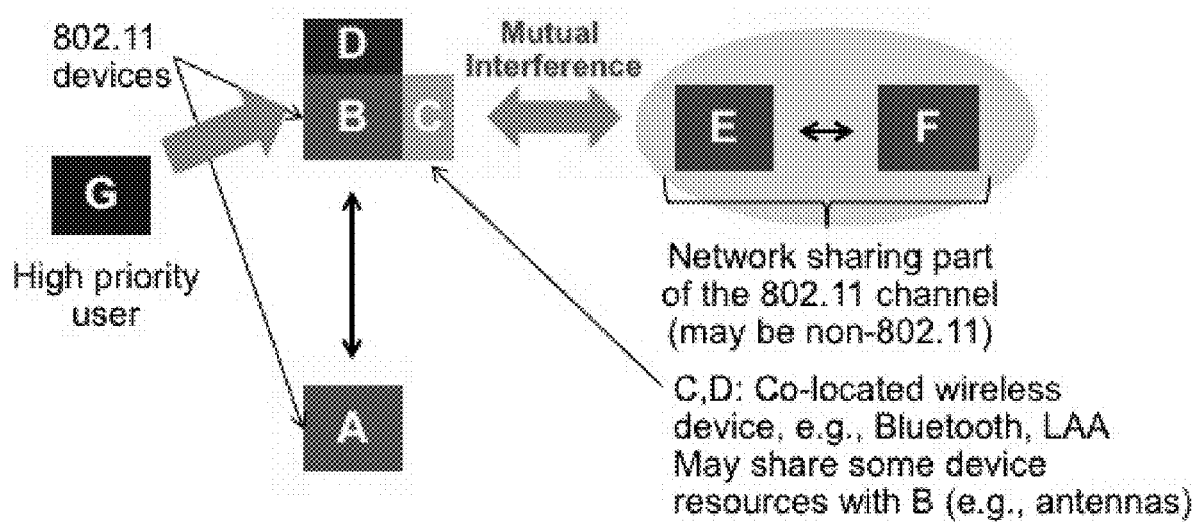
FIG. 1A is an illustration depicting an embodiment of an environment with several wireless devices or spectrum users.

Devices utilizing the IEEE 802.11 standard protocols (sometimes referred to as "802.11 devices" or "WiFi devices") typically operate on unlicensed spectrum that is shared with other 802.11 devices in what are often unplanned deployments. The spectrum may also be shared with other wireless technologies that operate on this unlicensed spectrum and may be co-located with the 802.11 device, possibly sharing resources such as antennas or radios. For example, the Bluetooth protocol and License-Assisted Access (LAA) on handsets may use these resources. The spectrum may also be shared with higher priority or "preferential" users of spectrum that 802.11 devices must detect and defer to, such as military or aviation radar systems. The spectrum may also be inundated with noise from electromagnetic emissions that may spectrally overlap with the current 802.11 channel. For example, as shown in FIG. 1A, interference (including both EM and scheduling interference) experienced by a wireless device "B" may be a result of other 802.11 devices (e.g. "A"), high priority users such as radar (e.g. "G"), co-located communications interfaces such as Bluetooth and LAA (e.g. "C", "D"), as well as non-802.11 devices that utilize the same spectrum (e.g. "E", "F").

Figure 1B:
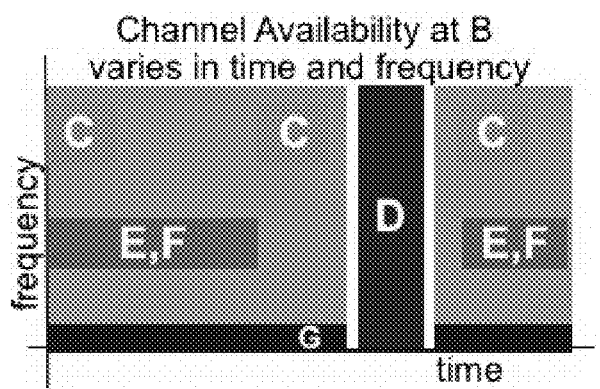
FIG. 1B is a chart depicting frequency utilization over time by multiple wireless devices or spectrum users in some embodiments.

As shown in the frequency over time chart of FIG. 1B, in some implementations, these various interfaces and users may utilize wide or narrow portions of the spectrum, for periodic intervals or constant transmissions. To communicate efficiently, a transmitter needs to know several parameters at the receiver, since these parameters are frequency- and device-dependent and may vary significantly in time. For example, the receiver may be constrained to not use certain subbands (e.g., due to an ongoing transmission in that subband close to the receiver, such as radar usage by "G"); the receiver may be constrained in how long it can use a currently idle channel (e.g. due to coexistence considerations such as a scheduled transmission from an onboard Bluetooth device "C"); the receiver may be constrained in how much transmission rate it can support on a channel (e.g., due to channel noise "E", "F"); the receiver may not have the necessary resources to support reception on some or all channels supported by the transmitter for some duration into the future (e.g., it may share antennas or other radio components with a co-located wireless device, such as Bluetooth "D").

Many factors may thus limit the communication capabilities of a device. Parameters may include the frequencies over which a device can communicate, the times at which the device can start communicating, the durations or times for which the device can communicate, the transmission rate at which the device can communicate, or other such parameters, and may be restricted. These restrictions or parameters may be time-varying and device-dependent depending on the activity of other users of the shared spectrum around each device. For example, in one implementation, available frequencies may change depending on whether other 802.11/LAA networks are transmitting. The available time to transmit may depend on how long before a device expects before another transmitter begins to transmit (e.g., Bluetooth). The time to begin transmission may depend on how long the device expects the transmission medium or channel to be busy. The transmission rate may be limited by the noise the devices sees on different frequencies.

Instead, the systems and methods described herein provide protocols to enable two 802.11 devices to exchange their dynamically-changing local channel availability table and form a mutual channel availability table with time, frequency and transmission rate domains available. This table may be used to make optimum opportunistic use of link resources by adapting packet duration, frequency utilization and transmission rate to channel conditions. In another aspect, the disclosed systems and methods enable 802.11 devices to signal that they will be unavailable for reception and/or transmission in some or all the subbands of a channel for an anticipated duration without impeding the transmissions of devices that overhear this signaling. This may be used to pause 802.11 transmissions and/or receptions on a device for an anticipated vacation period (e.g., the resources on the requesting device are being used by other co-located wireless technologies (e.g., Bluetooth) for a specified time; or frame transmission on the requesting device may be restricted to avoid interfering with co-located wireless technologies or with other 802.11 networks). This protocol permits a device to request specific pause durations without impacting the operation of other 802.11 devices (to which this pause is not intended) that may overhear such a pause request. In still another aspect, the disclosed systems and methods provide use of a multiuser orthogonal frequency-division multiple access (MU OFDMA) frame format to assign non-contiguous frequencies to a single station (STA). Once the receiver signals its readiness to receive, such frames may encode packets "around" unavailable parts of the spectrum signaled by the receiver. This may be achieved by assigning the receiver's STA identifier to all these non-contiguous frequency assignments. The receiver detects this STA ID repetition and decodes data on all these frequencies.

Figure 1C:
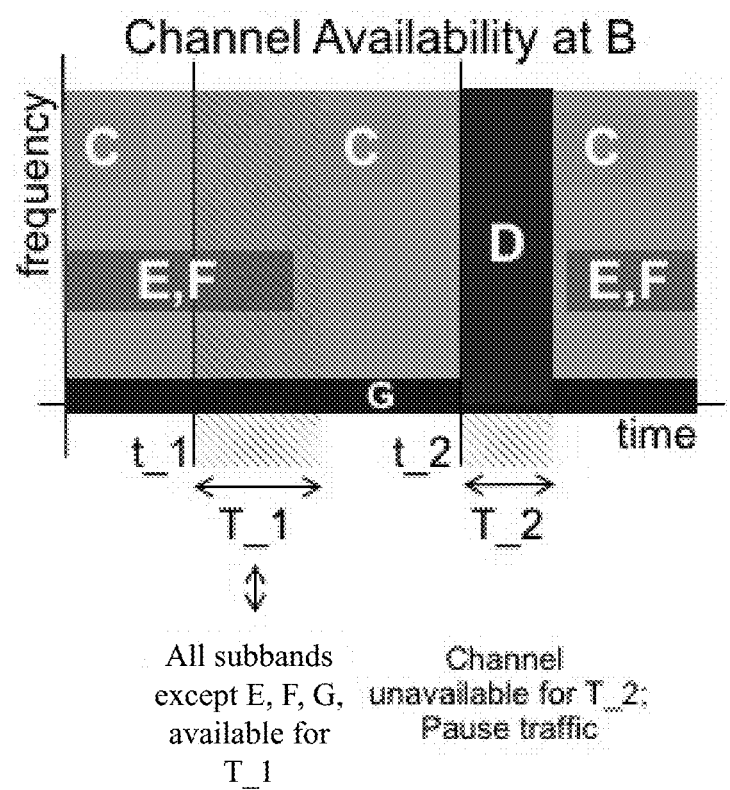
FIG. 1C is an illustration depicting band availability for the chart of FIG. 1B.

FIG. 1C illustrates band availability for the chart of FIG. 1B. In the example illustrated, device B of FIG. 1A tracks its channel availability in each subband. For a static long-term occupant such as G (e.g., a weather radar), device B simply informs its peers that G's subband is unavailable and continues to indicate the availability of other channels when the conditions on those channels permit. When queried at time $t\_1$, based on the traffic from devices E, F, and the anticipated traffic from co-located device C, device B may indicate that all bands except the (E, F)'s subband (and G's subband, as noted above) are available for a time $T\_1$. In anticipation of co-located device D's operation (which may constrain B's operation), device B may indicate the lack of availability of all channels for a period $T\_2$ starting at $t\_2$. This may occur either as an announcement or as a response to a query from a peer.

Local channel availability tables may be exchanged via any suitable means, such as during new management action frame exchanges during or after connection setup; new control frame exchanges prior to data transfer; or new control frames sent as a response to a Request-to-Send (RTS) frame. In other implementations, channel availability information may be embedded in currently existing frame formats, with fields in such frame formats repurposed for such an exchange (e.g. the A-control field of high throughput (HT) control field when encoding the HE control field; the recipient address (RA) field; or any other such field). In some implementations, multiple of these exchange methods may be used in combination. A device may request a pause in traffic for a specified time (e.g. at $T\_2$ of FIG. 1C) using local channel availability signaling by indicating that no channel is available.

Feedback protocols for channel-related information in 802.11 are typically restricted to signal-to-noise ratios (SNR) only via CQI (Channel Quality Indicator) feedback (access point (AP)-initiated); or per-band availability only, via BQR (Bandwidth Query Report) poll-response (AP-initiated, per-20 MHz). In some implementations, these protocols may be bandwidth limited, e.g. to 20, 40, 80 or 160 MHz only, with dynamic bandwidth RTS/CTS configuration (RTS-sender-initiated), and only a limited number of bandwidth options can be signaled. In some implementations, feedback protocols may only provide a recommended Modulation and Coding Scheme (MCS) in frames with a VHT control field (receiver-initiated). Typical implementations of 802.11 may not provide support for a STA to signal its preferred packet duration, preferred subbands, and transmission rate all at once to its peers/AP; or for a STA to use non-contiguous subbands over a channel to communicate with a single STA.

Similarly, typical implementations of 802.11 may not support "vacation announcements" from a STA where it will be unavailable for a specified time. Such vacations are unavoidable in the context of wireless coexistence. Traditionally the lack of such vacation announcements meant these vacations are emulated either through a power save announcement followed by cancellation, or through bogus CTS frames (to the device's own address or to a reserved address).

Figure 1D:
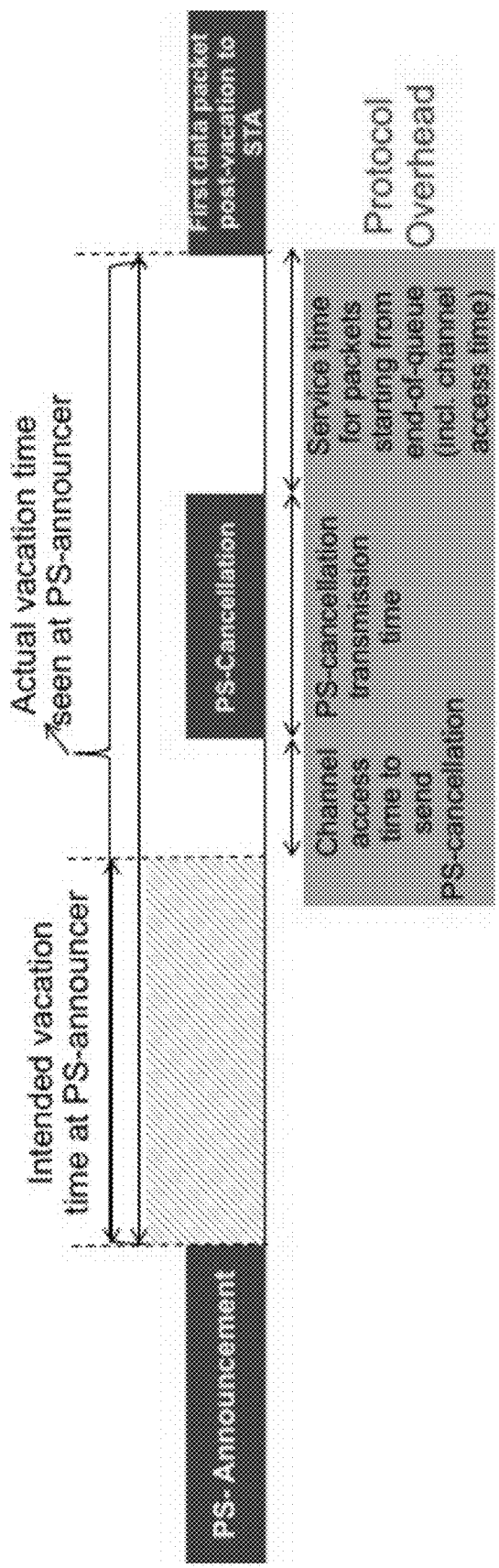
FIG. 1D is an illustration of an implementation of "vacation announcements" or unavailability advertisements via power save announcements.

FIG. 1D is an illustration of an implementation of "vacation announcements" or unavailability advertisements via power save announcements. As shown, the power save announcement may be used to begin an intended vacation time. However, the resulting actual vacation time is longer: the power-save cancellation announcement, intended to end the vacation time, is subject to medium access delay and contributes to protocol overhead. The time between the announcement and its subsequent cancellation is not known to the intended recipient of the announcement. As a result, this recipient (e.g., an AP) responds to a power save announcement by clearing packets addressed to the power save device from its packet queues. Therefore, restoring transmissions to this device after the power save cancellation will be subject to a scheduling delay because such packets are likely to be restored to the end of the queue and will have to wait their turn to be served. This overhead lowers throughput with announcement-cancellation sequences (e.g., when vacation periods are desired to coexist with multiple devices/connections).

Figure 1E:
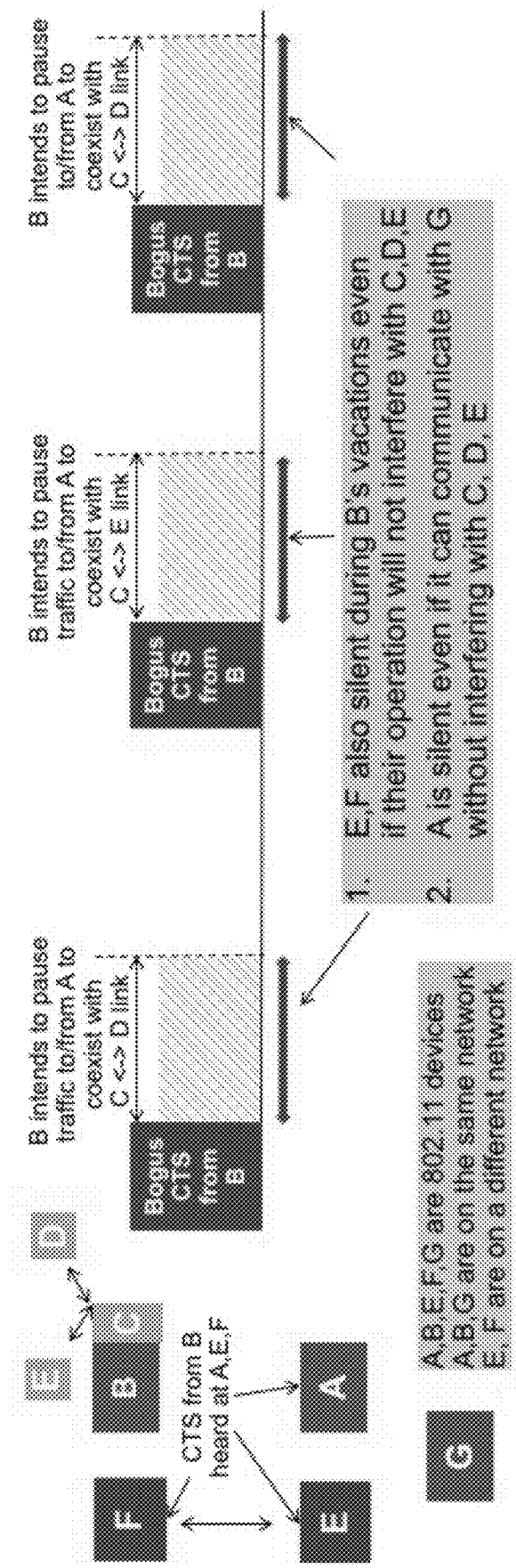
FIG. 1E is an illustration of an implementation of "vacation announcements" or unavailability advertisements via bogus clear to send (CTS) frames.

FIG. 1E is an illustration of an implementation of "vacation announcements" or unavailability advertisements via bogus clear to send (CTS) frames sent to the device's own address, preventing transmissions from other STA/APs. As shown, the bogus CTS frame directs other devices not to transmit, so as not to interfere with the CTS recipient device, resulting in reduced interference or increased protection for other devices. However, any device that overhears this bogus CTS frame (which it not addressed to itself) will avoid accessing the channel based on the duration field in the CTS frame (falsely) assuming an impending transmission to an 802.11 device. Frequent vacation periods dramatically reduce throughput on other links in an 802.11 network. For example, if a co-located Bluetooth device has multiple connections such as a headset, a mouse, a keyboard, etc., or has services that need to run periodically, e.g., scans/advertisements, these devices may pause communications upon receipt of the bogus CTS frame.

Thus, the lack of efficient flexible channel use protocols limits the capability of 802.11 to coexist with other wireless technologies, for example during the operation of co-located wireless devices that share the same channel/frequency band (e.g., 802.11, Bluetooth and/or LAA on mobile platforms such as smartphones); or during 802.11 operation in the presence of other networks (e.g., other 802.11, LAA or Bluetooth networks). Non-802.11 technologies rely on a master node to synchronize and assign resources in response to changing channel conditions. For example, in Bluetooth AFH, a designated Bluetooth master device changes the frequency hopping map as needed, over timescales typically much longer than individual packet. Similarly, in cellular (LTE/LTE-A/5G) communications, a base station (e.g., eNB) assigns resources to communicating peers in a network.

Instead, the systems and methods discussed herein provide a decentralized resource selection protocol between any pair of WLAN devices. This may provide particular advantages for WLAN and Bluetooth combo chipsets that provide connectivity solutions to mobile platforms (e.g., handsets, watches, tablets), and WLAN chipset products that provide access solutions. These systems and methods may also provide improved simultaneous WLAN and Bluetooth operation, with higher WLAN throughput and lower latency by flexible packet airtime sizing, packet timing and modulation feedback to avoid collisions; and higher throughput/lower latency Bluetooth connections. The systems and methods may also provide improved coexistence with co-located LAA and overlapping 802.11 networks, with higher 802.11 throughput and lower latency by flexible frequency use, packet sizing, packet timing and MCS feedback. This may be particularly useful in implementations in which WLAN operation may occur in a dynamic channel, including handsets where WLAN shares its radio resources with co-located Bluetooth or LAA; and mobile platforms (such as handsets, watches, laptops, tablets) and WLAN APs that operate in spectrally congested environments.

Devices may provide this improved protocol via the exchange of local channel availability tables (LCATs) that specify a set of frequency subbands or channels on which each device can receive and/or transmit, and for what time periods. The tables may be exchanged during handshaking or other inter-device communications such as when establishing communications. For example, when establishing a flexible channel utilization (FCU) session, a device may receive an LCAT from another device, and compare the received LCAT to its own LCAT to identify channels or subbands that match (e.g. are both available during the same transmission period). The resulting mutually agreed-upon channel availability table (MCAT) may be utilized to select channels. In some implementations, the MCAT may not need to be transmitted; rather, each device may transmit its own LCAT to the other device, and may individually determine via a local comparison of the LCATs what channels and times are available for the MCAT. In other implementations, one device may serve as a master, and the second device may provide an LCAT to the master device, which may perform the comparison and identify the MCAT subbands and times. The master device may then transmit the MCAT to the slave device.

Each LCAT may store a variety of channel parameters, including preferred frequency subbands for reception; preferred frequency subbands for transmission (which may be the same or different as the subbands for reception); duration of the reception preference information (e.g. what periods each preferred subband is available); duration of the transmission preference information; maximum preferred transmission Modulation and Coding Scheme (mcs) and number of spatial streams (nss), potentially on a per-frequency subband resolution; maximum preferred reception mcs and nss, again potentially on a per-frequency subband resolution, as well as any additional information, such as measured noise level in each frequency subband, received signal strength indicators (RSSI), a multibit resolution value for preferred subbands, etc.

Figure 2A:
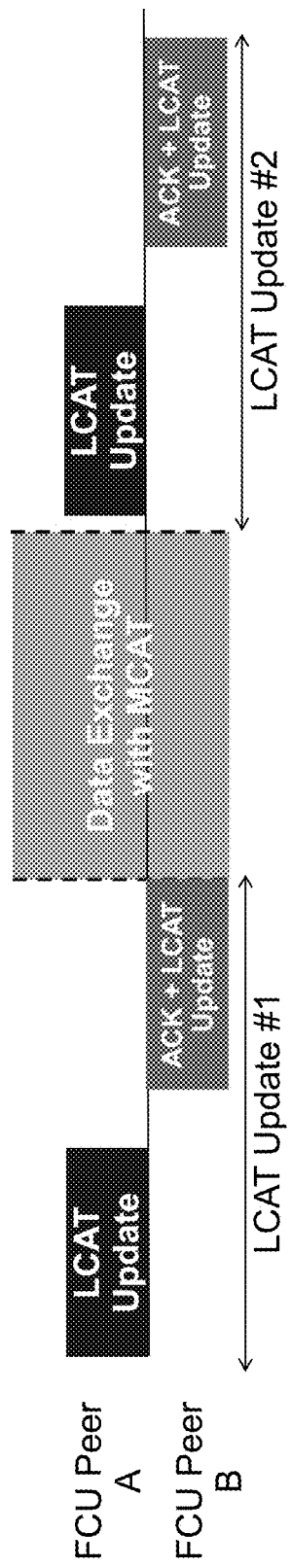
FIG. 2A is an illustration of local channel availability table (LCAT) updating via management frames, according to one implementation.

In some implementations, a first device acting as an FCU initiator may request an FCU session with an FCU-capable peer by sending its LCAT in a request frame, as shown in the diagram of FIG. 2A. The responding peer may compare its own LCAT with the initiator's LCAT and, based on the comparison, either accept or reject the FCU request. If the request is accepted, then the two devices may act as FCU peers, and communicate according to the mutual channel access table (MCAT). Requesting the FCU request may include the recipient transmitting its own LCAT to the initiator peer, such that each peer has a copy of the other's LCAT, and can independently determine the MCAT. Each set of peers may have different MCATs, and a first device may use a first MCAT for peering with a second device, and a second MCAT for peering with a third device.

To construct the MCAT, a device may compare each entry in its LCAT to corresponding entries in an LCAT received from the other device. Given a first device A and second device B, preferred frequency subbands for transmissions from A to B (W_tx_ab) may be determined as the intersection of preferred transmission frequency subbands of A (W_tx_a) and preferred reception frequency subbands of B (W_rx_b). Similarly, preferred frequency subbands for receiving data from B (W_rx_ab) may be determined as the intersection of preferred reception frequency subbands of A (W_rx_a) and preferred transmission frequency subbands of B (W_tx_b). Duration of the preference information for transmissions from A to B (T_tx_ab) may be determined as the minimum of the duration of the preference information for transmissions from A (T_tx_a) and the duration of the preference information for reception by B (T_rx_b). Similarly, duration of the preference information for reception from B (T_rx_ab) may be determined as the minimum of the duration of the preference information for reception by A (T_rx_a) and the duration of the preference information for transmissions by B (T_tx_b). The preferred modulation and coding scheme for transmissions from A to B (Mcs_tx_ab) may be determined as the minimum preferred modulation and coding scheme for transmissions from A (Mcs_tx_a) and the minimum preferred modulation and coding scheme for reception by B (Mcs_rx_b). Similarly, the preferred modulation and coding scheme for receiving data from B (Mcs_rx_ab) may be determined as the minimum preferred modulation and coding scheme for reception by A (Mcs_rx_a) and the minimum preferred modulation and coding scheme for transmissions by B (Mcs_tx_b). The second device may construct similar tables, and due to the symmetry of transmission and reception parameter calculations, may generate corresponding values (e.g. W_tx_ab will equal W_rx_ba, the corresponding preferred frequency subbands for reception by B from A; etc.). Implementations of coding these values from the table for transmission are discussed below in connection with FIG. 3A.

The LCATs/MCAT may be dynamically updated in response to changing channel conditions via exchange of LCATs during management or control frames. In some implementations, upon determining a change in channel conditions, one device may transmit its (newly updated) LCAT to the other device, and the other device may respond with its own (updated or not) LCAT so the devices may individually determine MCAT channels and times. In other implementations, one device may provide a new proposed MCAT based on a comparison of a previously received (and cached) LCAT from the other device to a newly updated LCAT of the device. This may potentially obviate one LCAT exchange, if the second device's LCAT has not changed.

Local Channel Availability Table Update Using Management Frames

As discussed above, in some implementations, a STA may update its local channel availability table (LCAT) in a dynamic environment (e.g., due to bursty interference, regulatory or coexistence considerations), with updated LCAT entries sent to its frequency/channel (FCU) peers in any of several ways. In one implementation, LCAT updates may be provided via an LCAT update frame. As discussed above, this may be incorporated in the FCU setup exchange, as shown in the implementation of FIG. 2A. The addressed STA may respond with its own LCAT entries corresponding to those that have changed. In some implementations, the update may be incorporated in a frame that is not part of the FCU setup exchange, such as updating the LCAT after the FCU peer relationship has been established (e.g. after handshaking).

The FCU peer may respond with its own LCAT, using the same options as above. For example, an LCAT update frame may be an 802.11 management action frame, such as an existing management action frame; an existing management frame (e.g., associated request/response, etc.); or in a management action frame newly defined for this purpose.

Local Channel Availability Table Update Using Control Frames

Figure 2B:
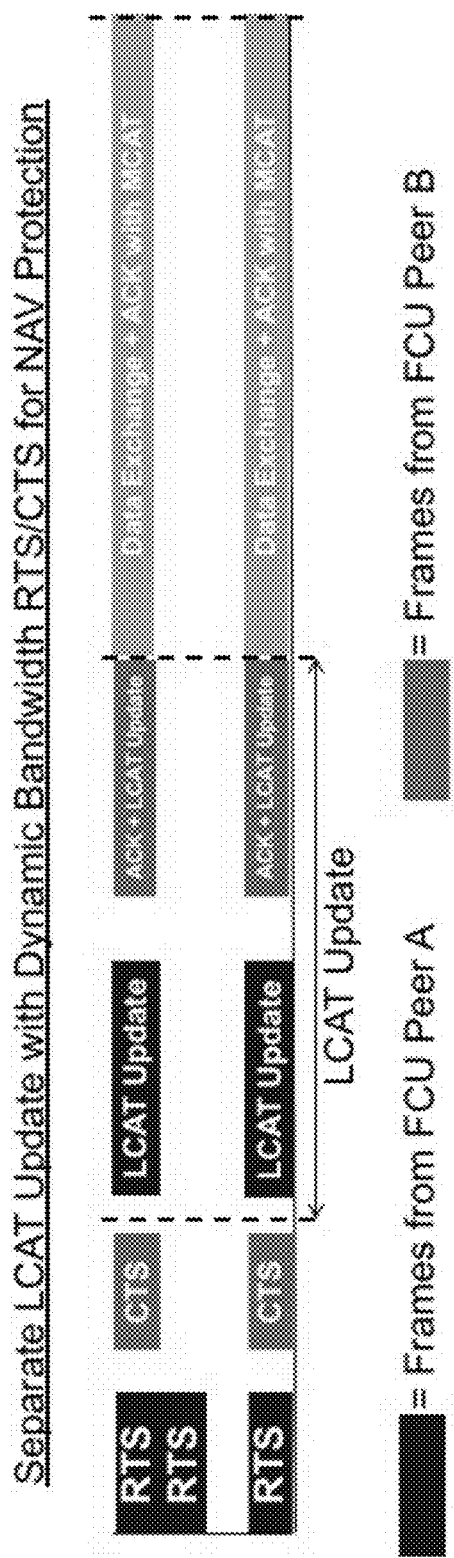
FIGS. 2B-2D are illustrations of LCAT updating via control frames, according to some implementations.
Figure 2C:
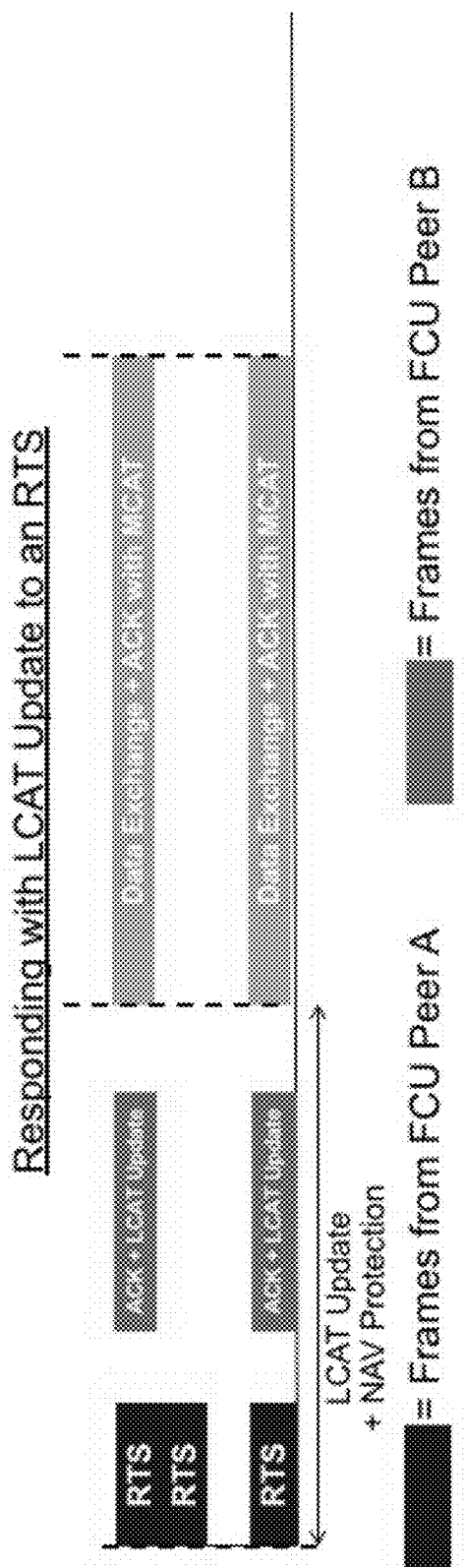
Figure 2D:
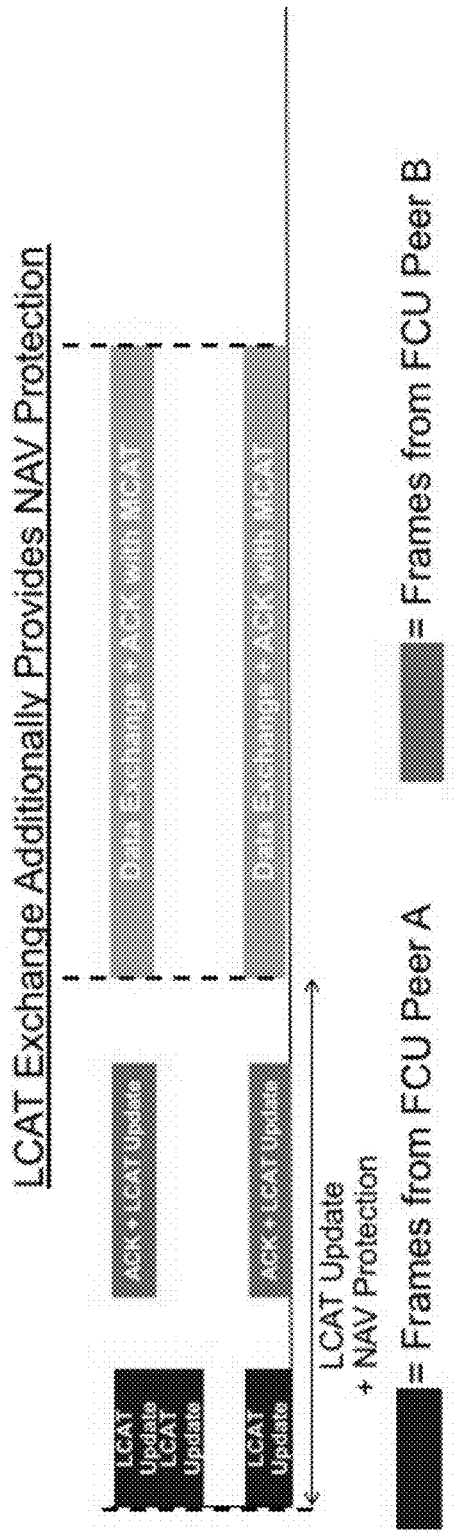

In another implementation, LCAT updates may be provided in control frames. This may better track changing channel conditions, with a frame exchange that precedes data transfer. For example, if a data transfer occurs after an RTS/CTS handshake, LCAT updates may occur prior to or after the RTS/CTS exchange, as shown in the implementation of FIG. 2B. The LCAT updates may be performed separately (e.g. as an update and acknowledgement plus update pair) as shown in FIG. 2B. In another implementation illustrated in FIG. 2C, the LCAT updates may be provided in response to an RTS notification. The LCAT information may be sent as a new extended control frame subtype or a new control frame type. To reduce overhead, the virtual CS protection provided by the RTS/CTS handshake may be achieved via the LCAT update handshake by encoding the LCAT in an extended control frame subtype or a new control frame type in the legacy PPDU format. In a similar implementation shown in FIG. 2D, the LCAT update may replace the RTS notification (e.g. with an exchange of LCAT followed by an LCAT instead of RTS/CTS). In another implementation, the LCAT update may include an exchange of an RTS followed by an LCAT control frame subtype (e.g., LCAT replaces CTS in the RTS/CTS exchange). Either of these exchanges will reserve the medium in a manner similar to an RTS/CTS exchange, while reducing overhead.

In some implementations, the LCAT exchange may be defined as a new control subtype and length field, or as an exchange using an action frame or an association frame (e.g. a proprietary exchange using a vendor-specific IE; an existing non-vendor-specific action frame; a vendor-specific action frame; or a new action frame defined for this purpose). Regardless of the frame type containing LCAT, in many implementations, the exchange may begin with an RTS message, and the response to the RTS notification may be the LCAT-containing frame.

In one implementation, a "generic" control frame subtype may be utilized for special purpose control frames that are not defined in 802.11 standards. So as to not limit these control actions, the "generic" control frame subtype may have contents can be mutually defined by the devices at connection time. For example, in one implementation, a generic subtype may be defined as follows:

May use one of the reserved subtypes 0-3 of control frames (type 1 MAC frames) in 802.11. The definitions of the other fields inside the frame control field may remain the same as the reserved subtype, or may be in addition to those fields;

The control frame may contain a duration field; a recipient address (RA) field for the receiver; and a transmitter address (TA) field for the sender. In some implementations, the frame may contain additional fields, such as an indication of the generic control action (e.g. an indication of the set of supported control actions, that may be exchanged at association time or before association); an indication of the length of the frame body that follows the length field (e.g. to allow variable length content, and future expandability); and any other information necessary to execute the control action.

In other implementations, the generic control frame may be defined as a new control frame extension subtype, with content as noted above.

Figure 3A:
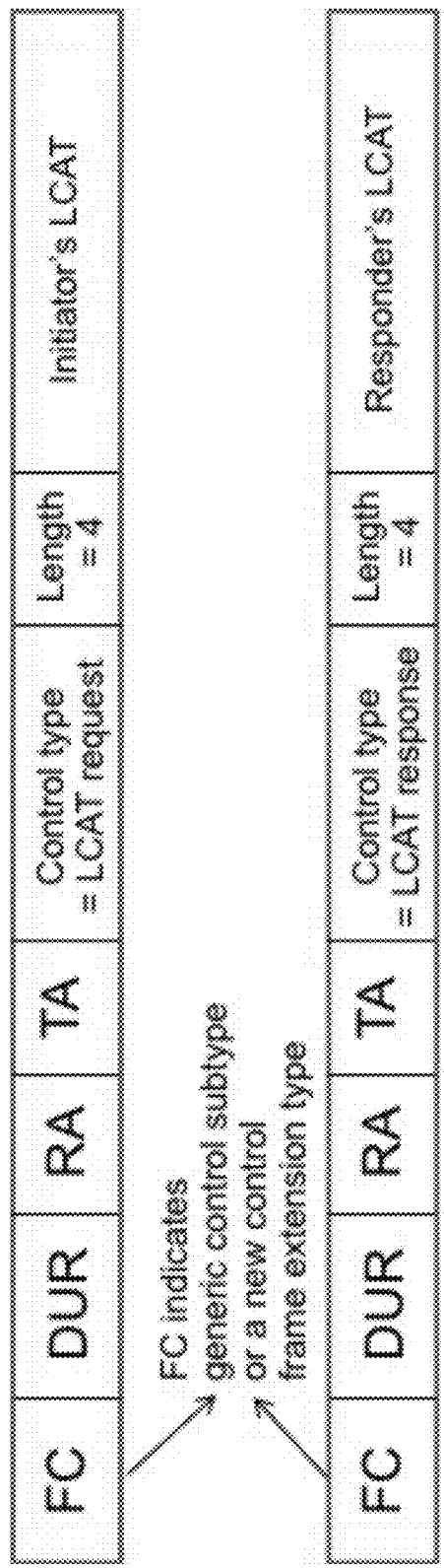
FIG. 3A is an illustration of an implementation of headers of an LCAT request and response protocol.
Figure 3B:
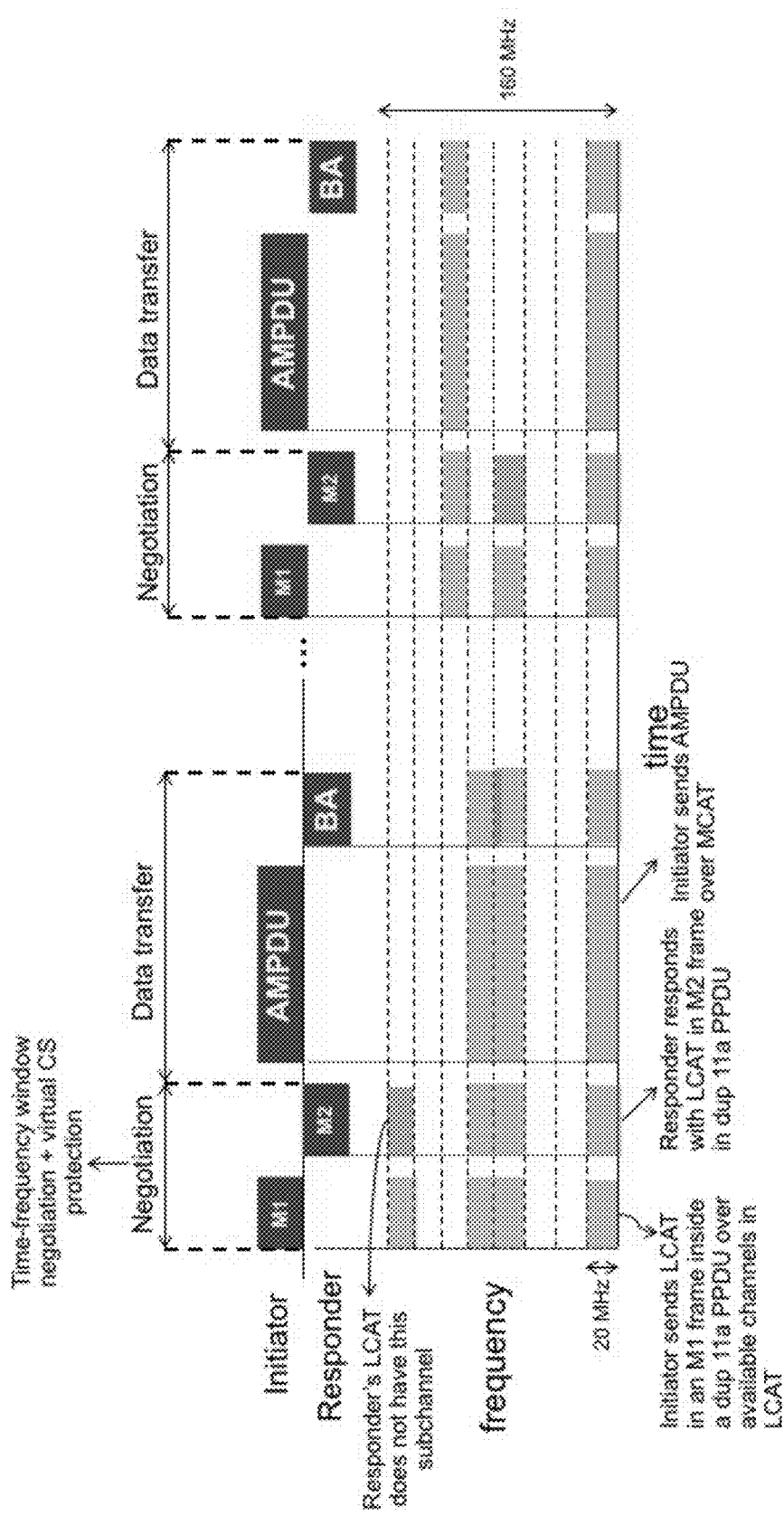
FIG. 3B is an illustration of a negotiation and data transfer procedure with per-packet mutual channel availability table (MCAT) utilizing the protocol of FIG. 3A, according to one implementation.

The LCAT handshake packets may have the following format, in some implementations, as shown in FIG. 3A: the LCAT initiator may send its LCAT request in a generic control frame type where the duration field may contain the proposed channel use time from the LCAT handshake initiator; the TA field may contain the initiator's MAC address; the RA field may contain the responder's MAC address; and the information provided in the content field may include the initiator's LCAT table. The LCAT responder may send its LCAT response in a generic control frame type where the duration field may contain the proposed channel use time from the LCAT handshake responder (e.g. the duration may correspond to the amount of time for which the LCAT information is valid, or the duration in the response might be less than the duration in the initiating frame); the RA field may contain the initiator's MAC address; the TA field may contain the responder's MAC address (though this may be omitted to reduce overhead, since the initiator is awaiting an LCAT request directed to the responder); and the information provided in the content field may include the responder's LCAT table. The tables may include preferred channels (W), durations (T), and MCS schemes, as discussed above in connection with FIG. 2A and the protocol description. These values may be concatenated and/or separated by delimiters, in some implementations. For example, for an LCAT that tracks 20 MHz subbands over a 160 MHz channel, mcs 0-11, nss 1-8 supported, the field lengths may be 8 bits for preferred Tx subbands (e.g. a binary string of 10010001 indicating, for example, from lowest to highest frequency, that bands 140-160 MHz, 60-80 MHz, and 0-20 MHz are preferred; this string may be bigendian or littleendian, depending on implementation); 8 bits for preferred Rx subbands (e.g. in a similar format as discussed above); 7 bits for max. preferred mcs+nss for Tx (e.g. according to the HT MCS Index values, in one implementation; or split with 4 bits to encode up to 16 MCS schemes (e.g. 0=BPSK 1/2; 1=QPSK 1/2; 2=QPSK 3/4; 3=16-QAM 1/2; etc.) and 3 bits to indicate up to 7 spatial streams), or any other such coding scheme; and similarly 7 bits for max. preferred mcs+nss for Rx, either with HT MCS index encoding or split as discussed above. This results in 30 bits of header data, and may be padded to 32 bites (4 bytes) in some implementations. FIG. 3B is an illustration of a negotiation and data transfer procedure with per-packet MCAT utilizing this protocol.

Embedding LCAT Information in Existing Frame Types

In other implementations, some fields in existing frame formats may be redefined to exchange some or all of LCAT information (assuming FCU peers can mutually upon such a usage). Some examples of such signaling are described below, along with drawbacks with respect to previously discussed approaches. Note that some of these approaches may be used together.

Figure 4A:
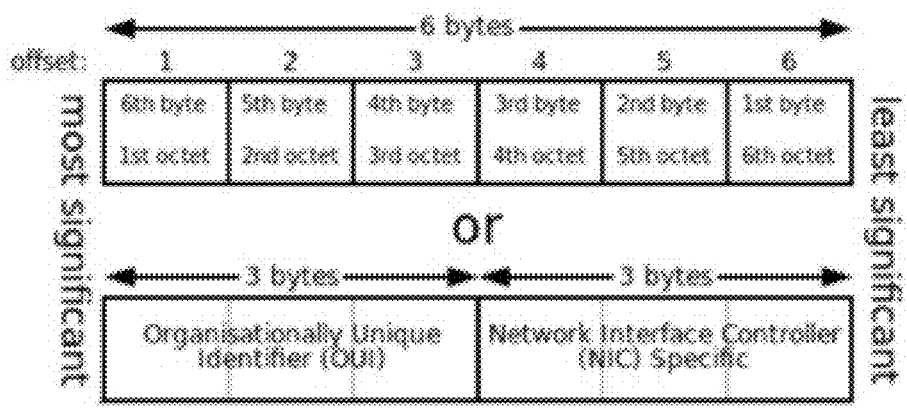
FIG. 4A is an illustration of an implementation of a unicast MAC frame.

In a first implementation, the LCAT information may be embedded inside the RA field. FIG. 4A is an illustration of an implementation of a unicast MAC frame. As shown, a unicast MAC frame in 802.11 may include a 6 byte MAC address to signify the Receiver Address (RA); divided into a 3-byte organization-specific address (OUI) and a 3-byte device-specific address (NIC) (Organizations can own multiple OUI addresses). FCU-capable devices may use MAC addresses with specific mutually-agreed OUI(s) to indicate that not all bytes in the NIC field signal the RA's NIC. The bits that do not match the peer's NIC specific bits may be used to encode LCAT information. Some pre-determined NIC specific bits in the RA may match the corresponding bits in the FCU peer's RA (this may be used by the FCU peer to identify frames it is intended to receive, in some implementations). Given that there are only 3 NIC specific bytes available, more bits assigned to LCAT will mean fewer bits are available to match FCU peer's NIC bytes (this may impact the peer's ability to uniquely identify its frames).

Figure 4B:
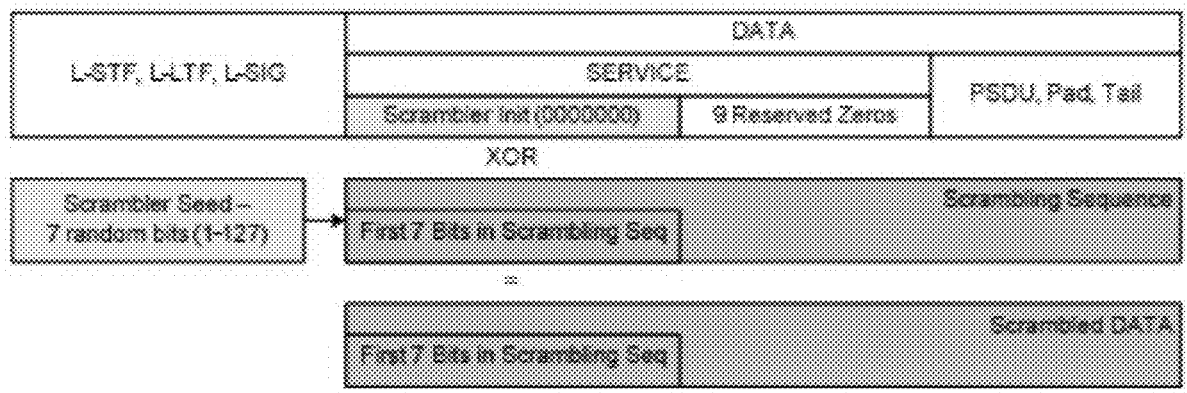
FIG. 4B is an illustration of an implementation of a scrambler seed preceding a payload.

In a second implementation, the LCAT information may be embedded inside the scrambler seed. FIG. 4B is an illustration of an implementation of a scrambler seed preceding a payload, and includes 7 random bits. A non-zero scrambler seed helps the physical layer reduce the probability of long sequences of repeated 0s or 1s (which may result in errors). The choice of this scrambler seed is pseudo-randomly picked by the transmitter in many cases for each transmission. Accordingly, in some implementations, the scrambler seed may be chosen to encode some LCAT parameters in a manner that is transparent to the physical layer and any other device that overhears this communication. The presence of this information in the scrambler seed may be signaled either through a dedicated OUI in the RA (per the implementation discussed above) or by other means (e.g. by inverting a bit in the MAC address in the frame to indicate the presence of more information in the scrambler seed). However, the scrambler seed size (7 bits) may limit the useful LCAT information that may be carried in the scrambler seed field.

Embedding LCAT Information in the Aggregated Control (A-Control) Field

Figure 5A:
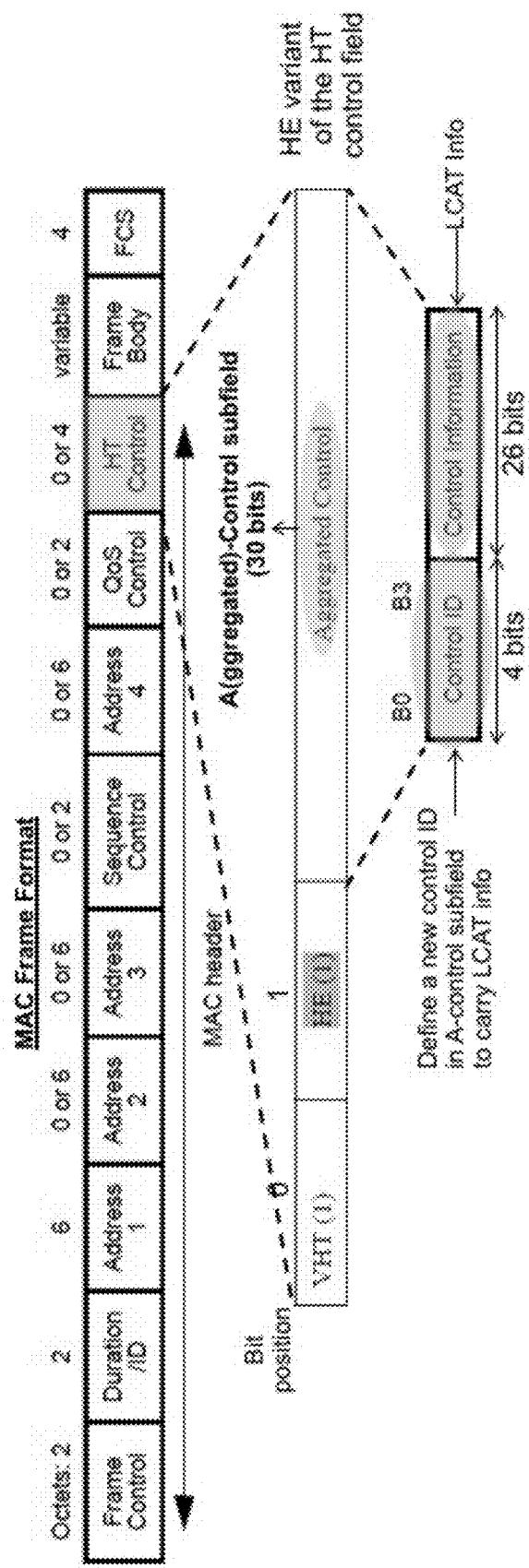
FIG. 5A is an illustration of a MAC frame format with LCAT signaling information embedded in the aggregated control field, according to one implementation.

In another implementation, LCAT signaling information may be included in the 26-bit control information of the aggregated control (A-Control) field. FIG. 5 is an illustration of a MAC frame with the A-Control field subfield highlighted.

In some implementations, such as with an LCAT with 20 MHz segment sizes that include global MCS/nss preference indicators, the signaling LCAT information may be included in the 26-bit control field, including:

an 11-bit duration of Rx preference information in 16 us resolution (signaling a maximum of $2^{11}*16$ μs, or 32768 μs (e.g. 0x0=16 μs)). The duration of Tx preference information may be less this duration.

an 8-bit subband Rx preference (e.g. one per 20 MHz channel). Non-availability for the duration signaled above may be signaled using an all-zero value in the subband availability field. The Tx subband preference may be a subset of the Rx subband preference.

A 7-bit maximum preferred mcs+nss on each subband

For example, a Rx preference information value of 0b00001010000 indicates 80*16 μs, or 128 ms. An 8-bit Rx preference value of 0b01110000 (1=indicates availability) indicates that the lowest 20 MHz subband (MSB) is unavailable; the next 3 consecutive 20 MHz subbands are available, and the upper 80 MHz is unavailable (last 4 LSBs are 0s). A max preferred mcs+nss: 0b0000000 indicates via the 4 MSBs=0b0000=mcs0, and 3 LSBs=0b000=nss1.

Figure 5B:
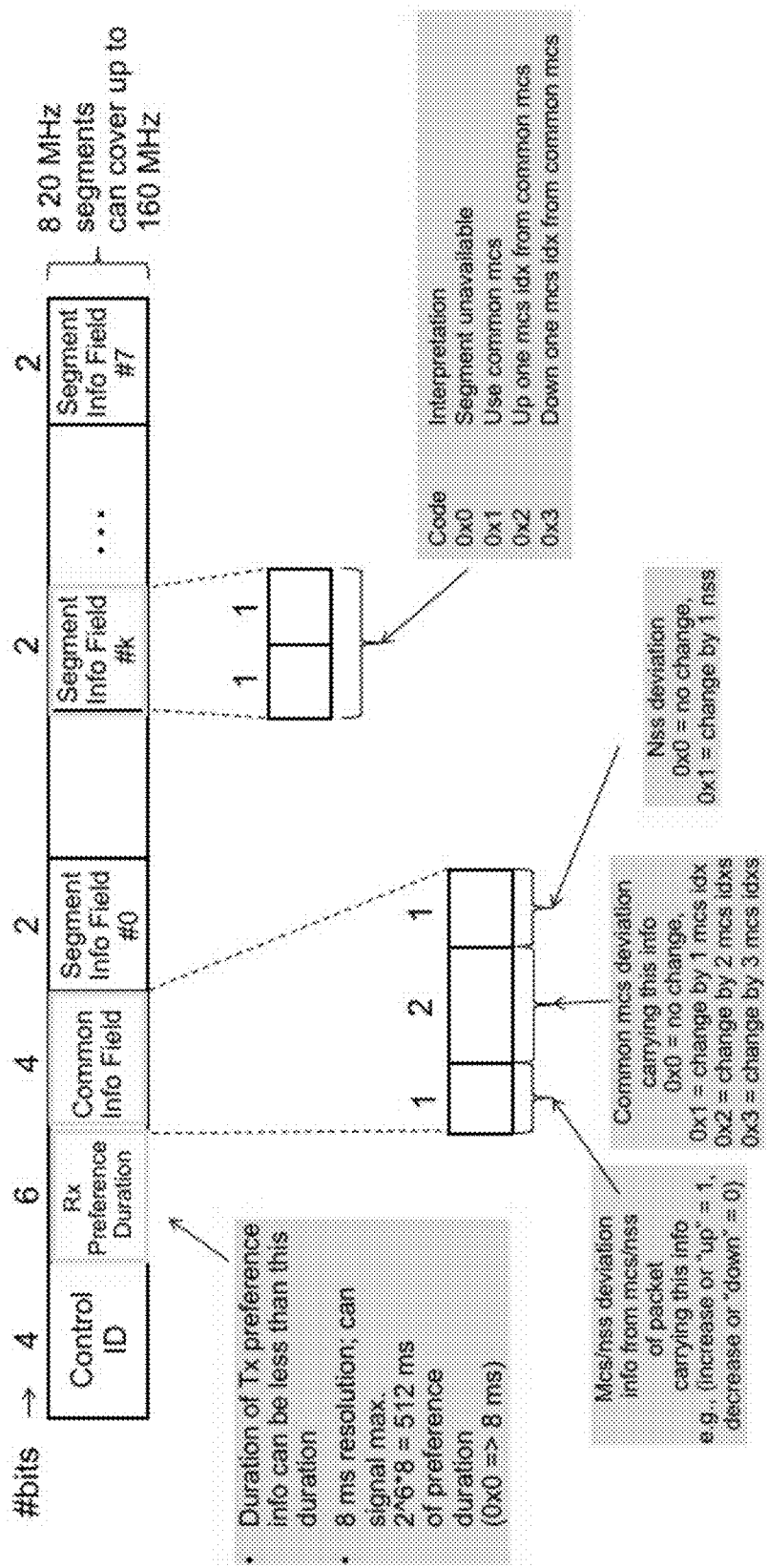
FIG. 5B is an illustration of an LCAT signal format with a per-segment MCS/nss preference indication, according to one implementation.

In another implementation, illustrated in FIG. 5B, MCS/nss preference may be indicated on a per-segment level. For example, given control information of 0b0011110111000110110000000, and a mcs+nss of a current frame of mcs4nss2. A Rx Preference Duration of 0b001111 indicates 15*8+8=128 ms duration. The Common Info Field value of 0b0111 indicates a common mcs/nss obtained by decreasing (indicated via the MSB of "0") the current frame's mcs by 0b11 (3 idxs) and nss by 0b1 (1 idx). Since the current frame mcs is mcs4nss2, the new common mcs is therefore mcs1nss1. The segment info field value of 0001101100000000 indicates: Seg0 (lower most 20 MHz): 00=unavailable; Seg1: 01: use common mcs; Seg2: 10: use mcs2nss1 (one mcs above common mcs); Seg3: 11: use mcs0nss1 (one mcs above common mcs); and Seg4-7: 00: Upper 80 MHz unavailable.

Physical Layer Frame Format

The physical layer frame preamble in 802.11ax indicates frequency assignment information, in many implementations. Frequency assignment may be measured in terms of the size of a tone block known as a Resource Unit (RU). Frame formats may be MU (multiuser) or SU (single user). However, typical implementations of these frame formats do not support non-contiguous frequency assignment to a single receiver. MU frame formats support at most one RU assignment per STA, with the smallest RU defined as 26 subcarriers (referred to as "RU26"). The preamble labels each assigned RU with one or more STAIDs (Multiple STAIDs per RU signify MU-MIMO transmission). However, assigning multiple RUs to the STA ID is not allowed.

Accordingly, in some implementations of the signaling protocols discussed herein, multiple RU assignments per STA may be allowed in MU frame formats. For example, this may be achieved by associating a single STA ID to more than one RU; or by associating multiple STA IDs to a single physical receiver so that signaling RU assignments to these multiple STAIDs may imply all such RUs need to be decoded at the same physical receiver.

Similarly, in typical implementations, SU frame formats assign exactly one of the RU sizes (RU242/RU484/RU996/RU2×996 tones respectively; correspond to approximately 20/40/80/160 MHz respectively) to the intended receiver. In implementations of the protocols discussed herein, this restriction maybe removed, allowing multiple RU sizes to be assigned to a receiver. Additional signaling bits in the preamble of the SU frame may be provided so as to signal these RU assignments.

Thus, a receiver processing an MU frame may look for possible multiple RUs it needs to process. For example, this may be achieved by finding a single STAID being assigned multiple RUs; or by finding a RUs assigned to multiple STAIDs but meant for a single receiver. Implementations of this method utilize additional overhead in signaling multiple STAIDs or STAID repetitions to assign multiple RUs to the same physical receiver. This approach may be used even when individual RU242 blocks in an MU frame are centered on individual 20 MHz subbands that constitute the full band channel. Such centering may have the benefit of reducing leakage into/from unused 20 MHz subbands. Signaling such alignment may be signaled by an additional signaling bit in the preamble, in some implementations.

To reduce spectrum leakage into unused subbands, some of the occupied RUs may be moved away from the unused subband boundary. The locations of the shifted RUs may be signaled by the transmitter of such tone blocks as part of LCAT exchange. Alternatively, this info may also be signaled by vendor specific management action frames prior to any data transfer with the above-mentioned shifted tone blocks.

As noted above, typical SU frame formats support only a single RU assignment of RU242/484/996/2×996. This restriction may be removed in implementations of the protocols discussed herein. Additional signaling bits may be necessary in the SU frame preamble to indicate more flexible frequency assignments to the intended receiver. For example, an SU frame centered on the channel can have RU assignments at a desired level of granularity inside individual subband. These may then be concatenated. For example, in one such implementation, given RU26 granularity, subband size=RU242 (approx. 20 MHz), channel bandwidth=80 MHz, there are 9 RU26 tone blocks inside an RU242→9-bit tone map; and 4 such RU242 blocks inside an 80 MHz channel and there is a center RU26. The total RU26 tone blocks=9*4+1=37 signaling bits. In another such implementation, given RU242 granularity, subband size=242, channel bandwidth=80 MHz, there are 4 total signaling bits utilized.

Figure 6A:
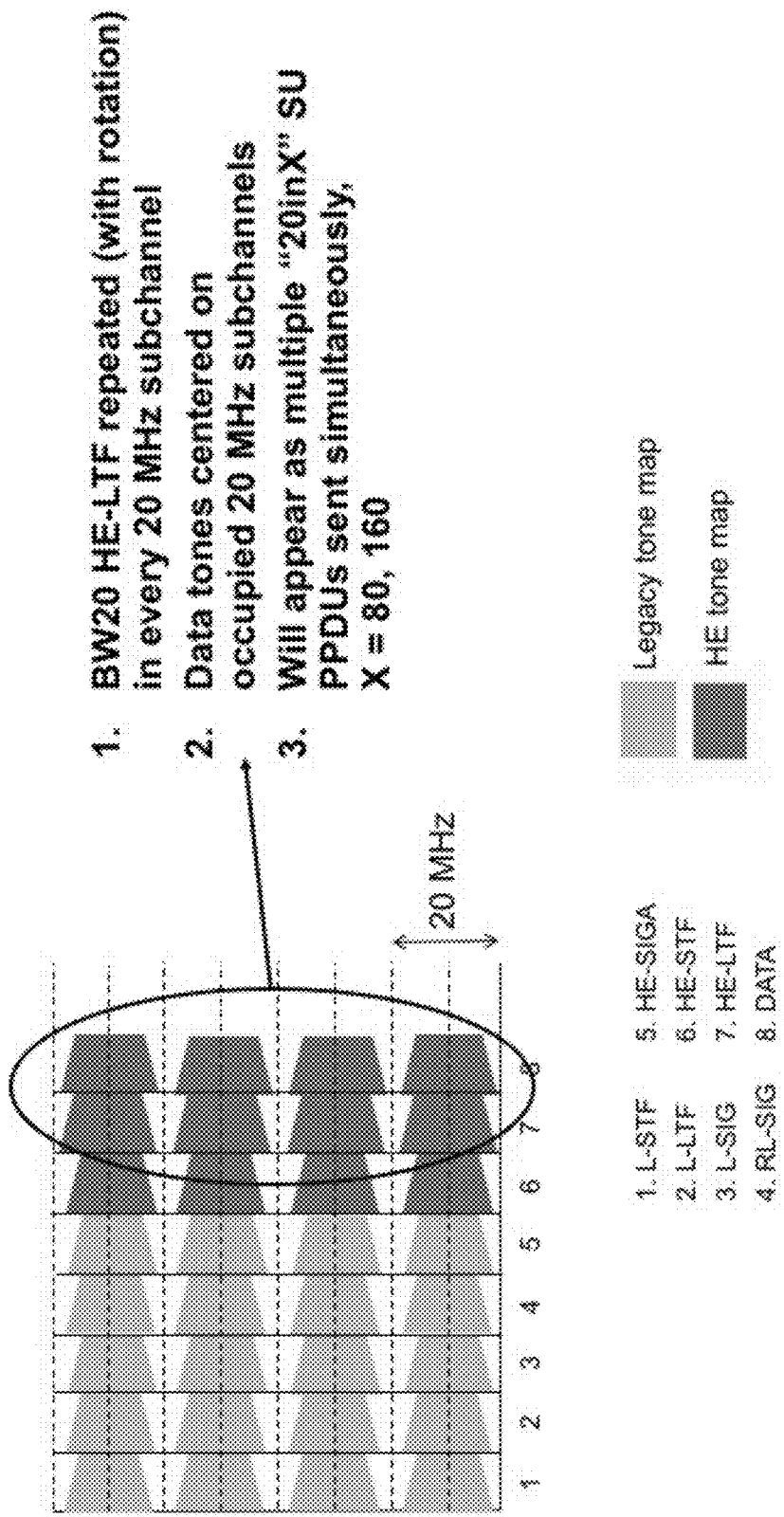
FIG. 6A is an illustration of frequency assignment across subbands, according to one implementation.

The same procedure can be used with the RU242 tone blocks centered on individual 20 MHz subbands. As discussed above, for MU implementations, such alignment may be indicated by an additional signaling bit in the preamble. FIG. 6A is an illustration of frequency assignment across subbands, according to one implementation. For forward error correction, different frequencies assigned to a single user may contain multiple PSDUs which are encoded across all or a subset of these assigned frequencies. There may be one PSDU per RU or a combination of one PSDU per RU and multiple RUs per PSDU. Different RUs may be encoded at different mcs+nss settings.

Figure 6B:
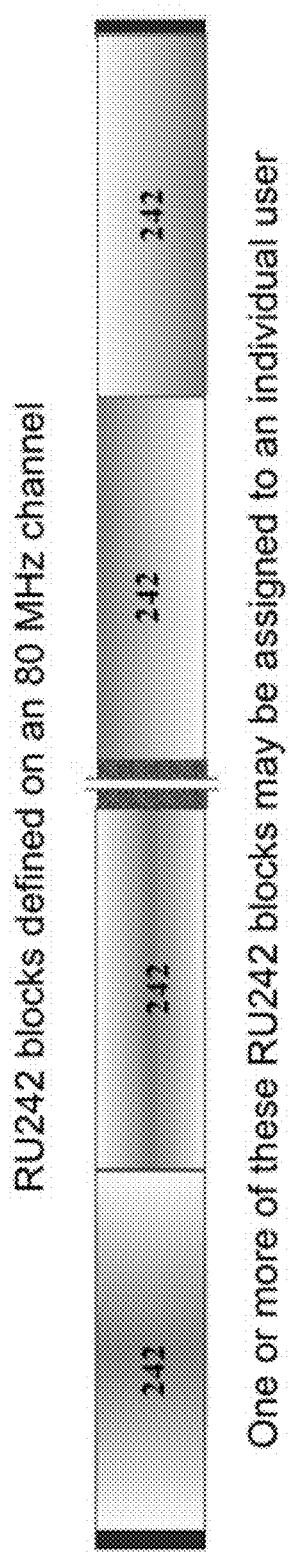
FIG. 6B is an illustration of channel mapping for multiple users, in some implementations.
Figure 6C:
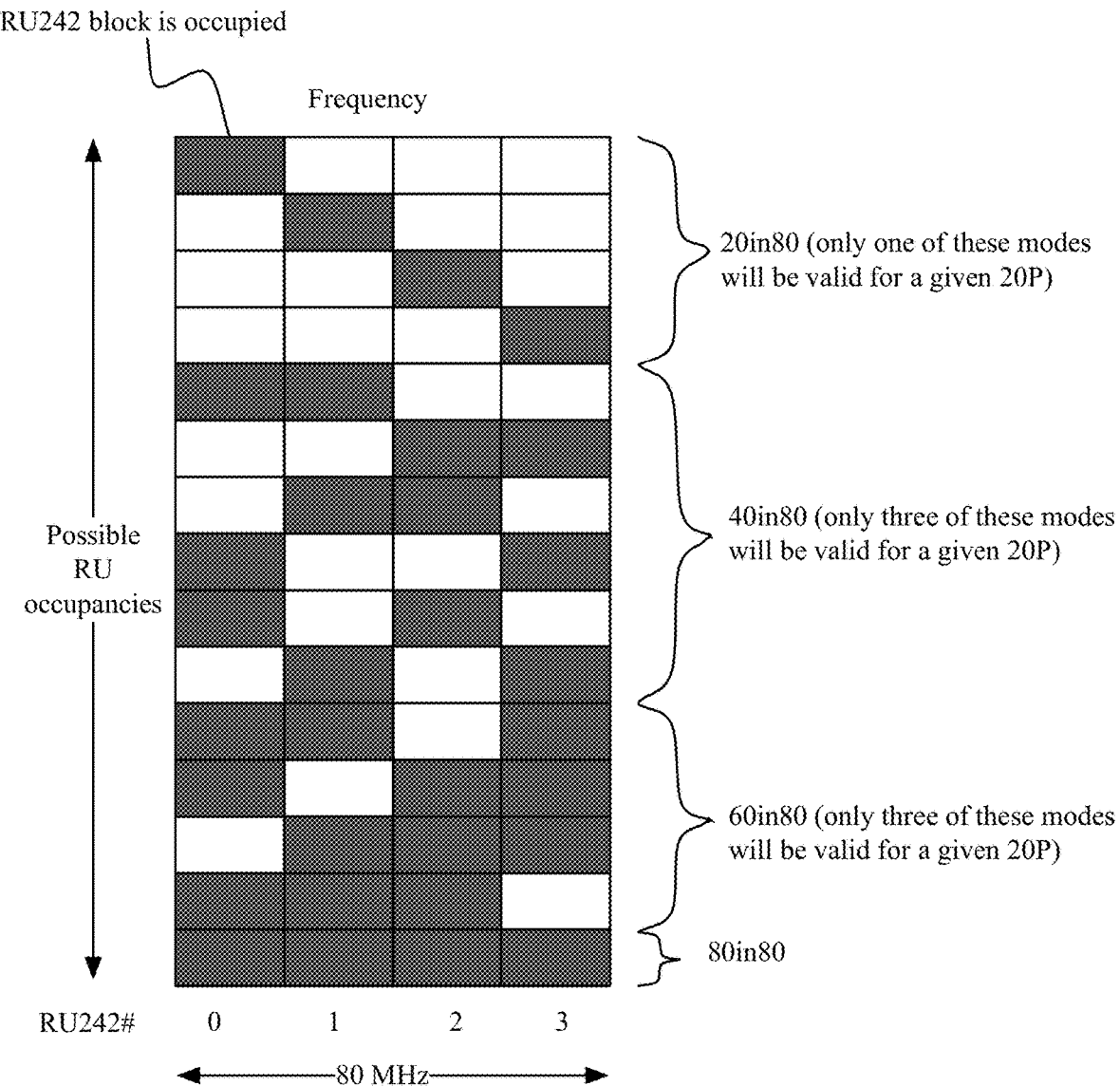
FIG. 6C is an illustration of RU242 block signaling and assignment modes, according to one implementation.

An example of a frame format channel mapping for a multiple user implementation is illustrated in FIG. 6B. In the illustrated example, the channel bandwidth is 80 MHz, and the frame format is high efficiency (HE), Multiple User (MU). Multiple RU242 blocks may be assigned to a single user. A single RU242 block may be assigned either as a single RU242 block in an OFDM tone map centered on the 80 MHz channel. Alternatively, the assigned RU242 may be contained in a frame that uses an OFDM tone map centered on a 20 MHz subchannel (HE MU or SU) inside an 80 MHz channel. In another implementation, two RU242 blocks may be assigned as two contiguous or non-contiguous blocks inside in an OFDM tone map centered on the 80 MHz channel. Two contiguous RU242 blocks may be signaled as a single RU484 block in such a frame; or the RU484 block may be contained in a frame that uses an OFDM tone map centered on a 20 MHz subchannel (HE MU or SU) inside an 80 MHz channel. In yet another implementation, three RU 242 blocks may be assigned as an RU484 block and an RU242 block in an HE MU PPDU that may use the OFDM tone assignment centered on the 80 MHz channel. Alternatively, they may be signaled as 3 RU242 assignments inside such a frame. In still another implementation, 4 RU242 blocks may be assigned in an HE MU PPDU that uses the OFDM tone assignment centered on the 80 MHz channel. Alternatively, they may be signaled as a single RU996 assignment inside an HE SU or MU frame. An implementation of assignment and signaling modes are illustrated in FIG. 6C. This may be further extended to 160 MHz: 80P occupancy follows 80 MHz maps discussed in the previous slides; any of the 2^4 subband occupancy patterns are allowed in 80S. As a result, the 8 RU242 patterns for 80 MHz*2^4 may be expanded to 128 possible RU242 allocation patterns in 160 MHz.

Figure 7A:
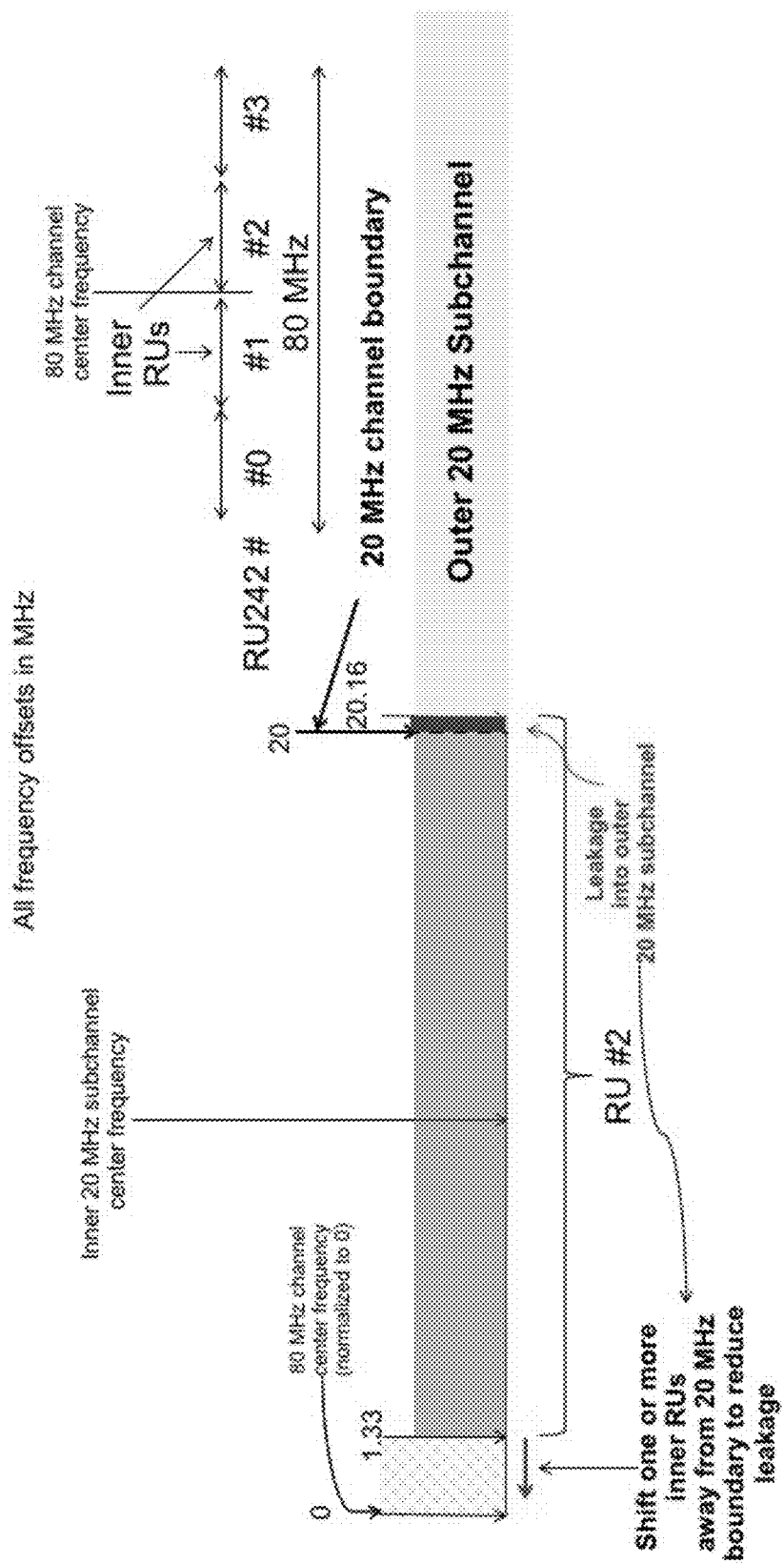
FIG. 7A illustrates tone shifts that may be utilized to reduce leakage of inner RU242 subbands into outer 20 MHz subchannels, according to one implementation.
Figure 7B:
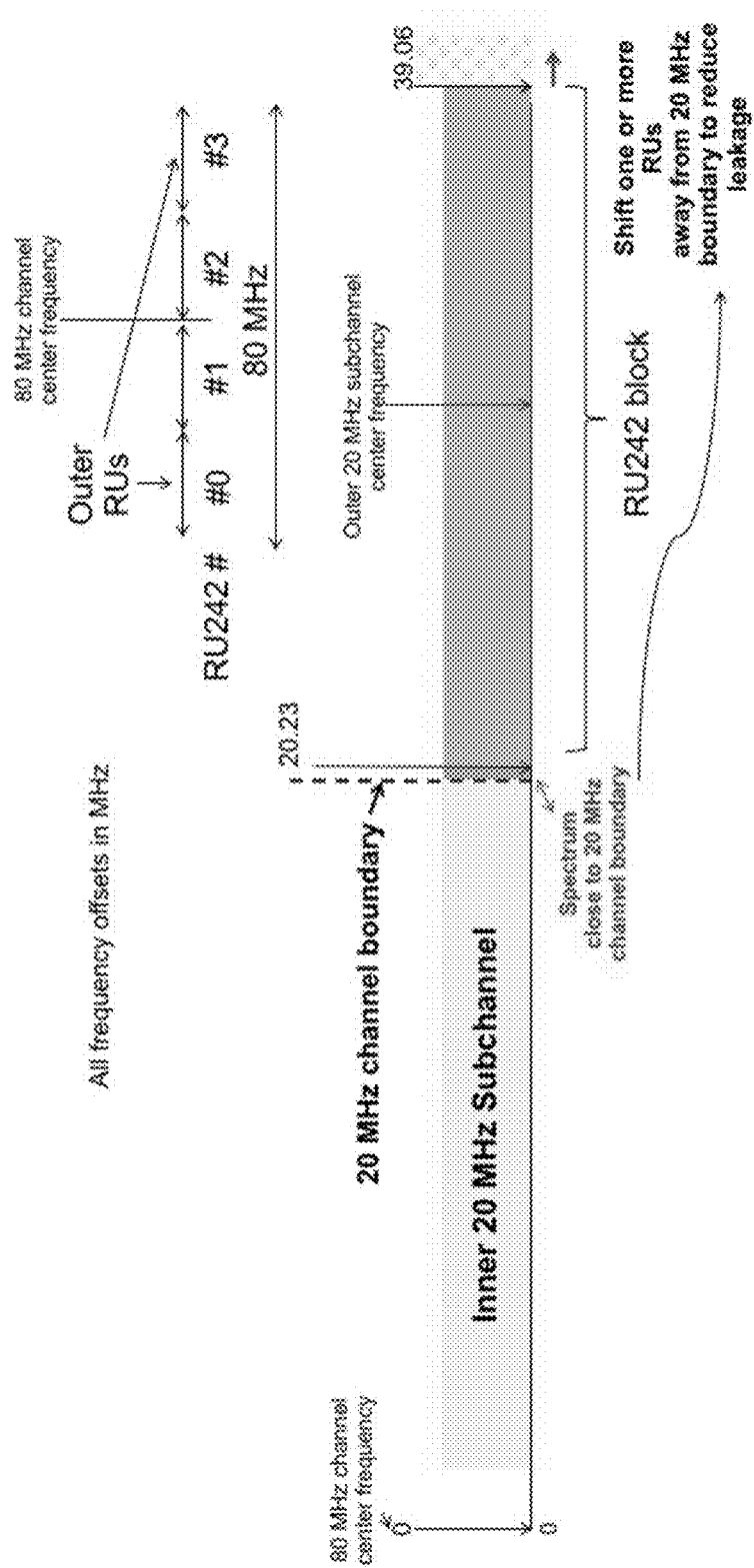
FIG. 7B illustrates tone shifts that may be utilized to reduce leakage of outer RU242 subbands into inner 20 MHz subchannels, according to one implementation.

As discussed above, channels may be shifted to provide protection and/or reduce leakage into other bands. FIG. 7A illustrates tone shifts that may be utilized to reduce leakage of inner RU242 subbands into outer 20 MHz subchannels, according to one implementation. Similarly, FIG. 7B illustrates tone shifts that may be utilized to reduce leakage of outer RU242 subbands into inner 20 MHz subchannels, according to one implementation.

FIG. 8A is a table of pre-FEC padding values, according to one implementation. For example, given 242-tone RU size, and 'm' denoting the number of RU242 blocks, N(SD, m)*(number of data subcarriers)=m*242, and for each m, N(SD,short)=m*60 (for DCM=0). Based on the 'm' parameter, N_DBPS is modified to m*N_SD*N_BPCS*R*N_SS. The rest of the calculation for post-FEC padding remains the same as in typical implementations. Based on these calculations the number of OFDM symbols will be known, and fields in L-SIG and HE-SIGA may be calculated as follows: if 20S is punctured, HE-SIGA BW bits will signal 4 (channel BW=80 MHz) or 6 (channel BW=160 MHz); if 20S is not punctured, but there is at least one RU242 that is left unassigned, then HE-SIGA BW bits will signal 5 (channel BW=80 MHz) or 7 (channel BW=160 MHz).

The LDPC tone mapper parameter may be calculated such that N_SD=m*234 where 'm' is the number of RU242 blocks (e.g. there are 234 data tones in an 242-tone block), and the tone mapper parameter D_TM is therefore 18. For example, for 3×242, N_SD=3*234=702:

$$d''_{t(k),i,n,l,r,u} = d'_{k,i,n,l,r,u}$$

$$t(k) = D_{TM}\left(k \bmod \frac{N_{SD}}{D_{TM}}\right) + \left[\frac{k \cdot D_{TM}}{N_{SD}}\right]$$

In addition to the preferred subbands a device may maintain a score for each subband in the LCAT indicative of the channel availability on that subband. This score may vary with time, and may include or may be computed based on: the maximum MCS/NSS supported on a subband; the duration for which each subband is estimated to be available; and/or the channel availability and/or interference seen on a subband. The LCAT handshake may involve providing these scores for some or all of these subbands to the FCU peer. An FCU peer may use these scores to decide how it may communicate with its FCU peer. For example, it may choose the subbands, mcs/nss and the duration for which it may communicate with its FCU peer based on an algorithm that includes the score values.

Figure 8B:
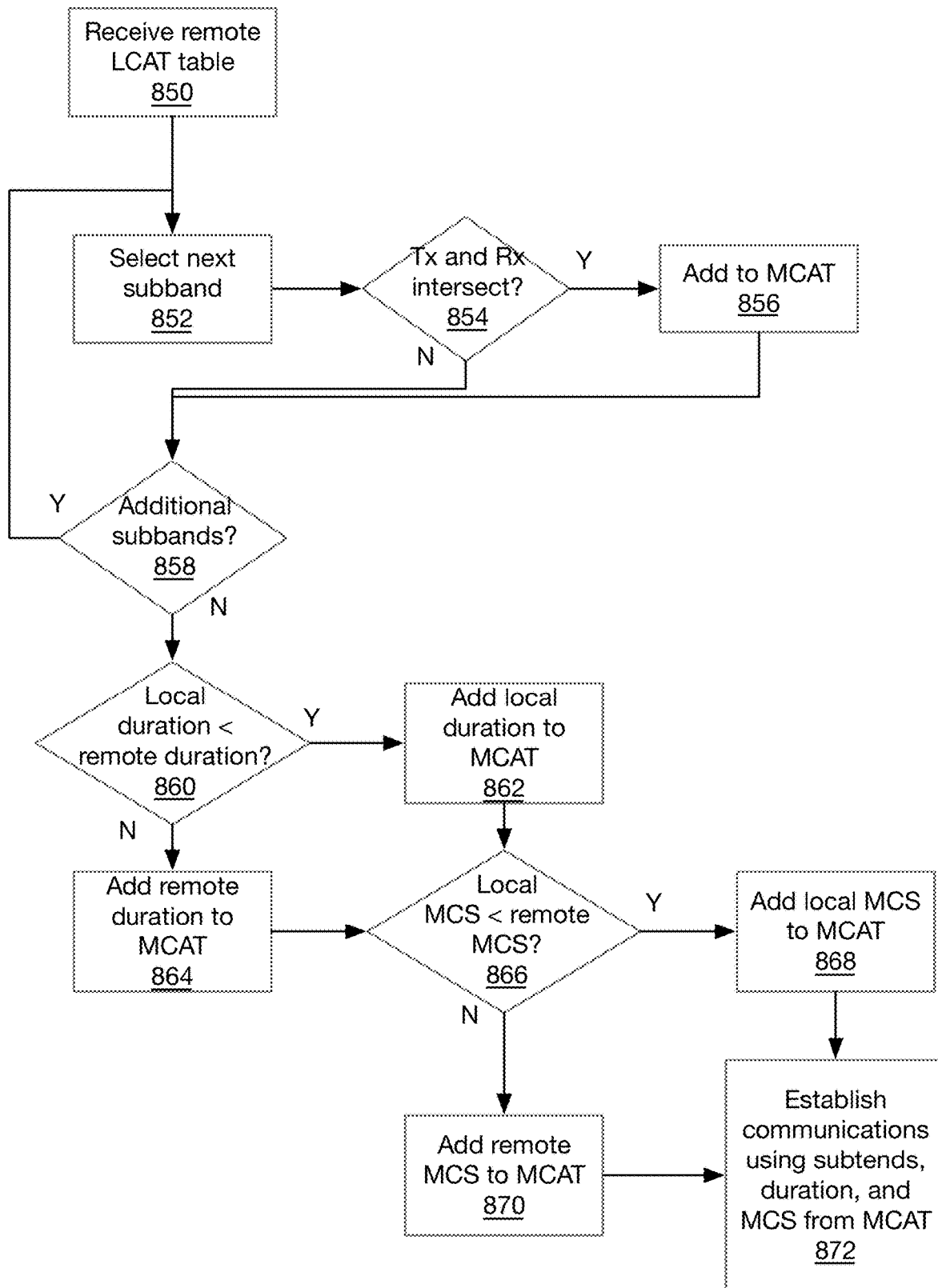
FIG. 8B is a flow chart illustrating an implementation of determination of MCAT parameters.

FIG. 8B is a flow chart illustrating an implementation of determination of MCAT parameters. As discussed above, in some implementations, each device may share its local LCAT table during handshaking, and may independently determine the MCAT from the combination of its local LCAT and the shared or remote LCAT from the other device. In other implementations, one device may analyze the LCAT parameters and generate the MCAT table, and may share the MCAT with the other device.

At step 850, a first device may receive a remote LCAT table from a second device. As discussed above, this may be done during handshaking, or during an update, such as via a management or control update. The first device may also generate or retrieve a local LCAT of the first device (e.g. from a cache).

At step 852, the first device may select a first subband of a plurality of subbands identified in the LCAT. At step 854, the first device may determine if the local LCAT and the remote LCAT include identifiers for the first subband indicating that the subband is preferred for each device. If so, the subband may be added to the MCAT at step 856. In some implementations, this may be done in series for each subband, repeating at step 858 as shown. In other implementations, a string of the local LCAT for preferred channels may be compared against a corresponding string of the remote LCAT via a bitwise AND (e.g. a string of preferred transmission channels of the first device compared on a bit for bit basis to a string indicating preferred reception channels of the second device, and vice versa).

At step 860, the first device may determine if a duration for which the preferred subbands are valid of its local LCAT table is less than a duration for which the preferred subbands are valid of the remote LCAT table. The first device may determine this, in some implementations, by subtracting one duration from the other, and determining if the resulting sum is positive or negative (e.g. subtracting the local LCAT duration from the remote LCAT duration, and if the result is negative, then the local LCAT duration is greater). The minimum duration of either the local or remote LCAT table may be added to the MCAT at steps 862 or 864 as shown.

Similarly, at step 866, the first device may determine if a preferred MCS/NSS index value of the local LCAT table is less than the preferred MCS/NSS index value of the remote LCAT table. As with the duration, the minimum of the local or remote MCS/NSS may be added to the MCAT table at steps 868 or 870 as shown.

Finally, once the matching subbands and minimum duration and MCS/NSS parameters have been identified, at step 872, the devices may communicate in accordance with the FCU table.

Accordingly, the proposed protocols and signaling methods discussed herein provide higher throughput/low latency connections made possible by optimizing bandwidth, packet size, transmission times, and antenna utilization.

B. Computing and Network Environment

Figure 9A:
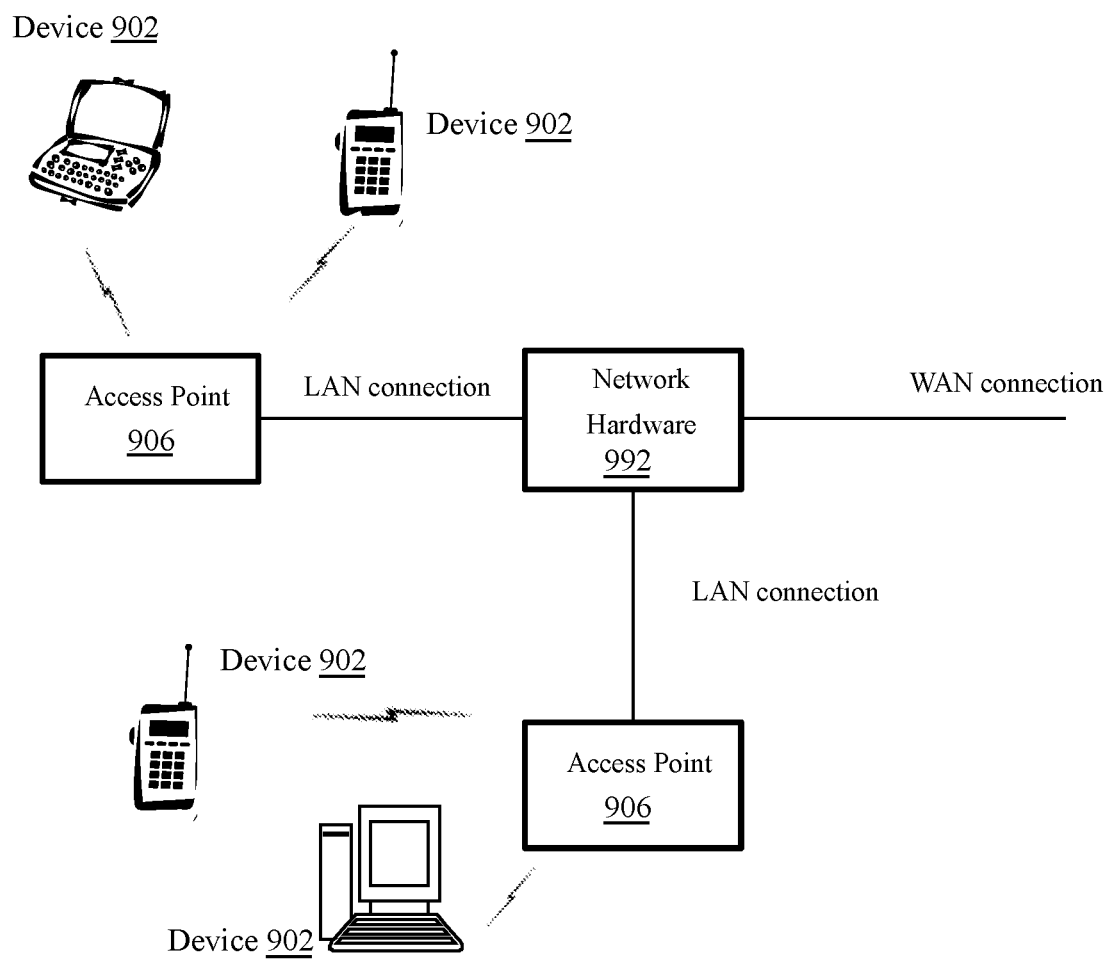
FIG. 9A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 9A, an embodiment of a network environment is depicted. In brief overview, the network environment includes a wireless communication system that includes one or more access points 906, one or more wireless communication devices 902 and a network hardware component 992. The wireless communication devices 902 may for example include laptop computers 902, tablets 902, personal computers 902 and/or cellular telephone devices 902. The details of an embodiment of each wireless communication device and/or access point are described in greater detail with reference to FIGS. 9B and 9C. The network environment can be an ad hoc network environment, an infrastructure wireless network environment, a subnet environment, etc. in one embodiment.

The access points (APs) 906 may be operably coupled to the network hardware 992 via local area network connections. The network hardware 992, which may include a router, gateway, switch, bridge, modem, system controller, appliance, etc., may provide a local area network connection for the communication system. Each of the access points 906 may have an associated antenna or an antenna array to communicate with the wireless communication devices 902 in its area. The wireless communication devices 902 may register with a particular access point 906 to receive services from the communication system (e.g., via a SU-MIMO or MU-MIMO configuration). For direct connections (e.g., point-to-point communications), some wireless communication devices 902 may communicate directly via an allocated channel and communications protocol. Some of the wireless communication devices 902 may be mobile or relatively static with respect to the access point 906.

In some embodiments an access point 906 includes a device or module (including a combination of hardware and software) that allows wireless communication devices 902 to connect to a wired network using Wi-Fi, or other standards. An access point 906 may sometimes be referred to as an wireless access point (WAP). An access point 906 may be configured, designed, and/or built for operating in a wireless local area network (WLAN). An access point 906 may connect to a router (e.g., via a wired network) as a stand-alone device in some embodiments. In other embodiments, an access point can be a component of a router. An access point 906 can provide multiple devices 902 access to a network. An access point 906 may, for example, connect to a wired Ethernet connection and provide wireless connections using radio frequency links for other devices 902 to utilize that wired connection. An access point 906 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 906 may be used for (e.g., in-home or in-building) wireless networks (e.g., IEEE 802.11, Bluetooth, ZigBee, any other type of radio frequency-based network protocol and/or variations thereof). Each of the wireless communication devices 902 may include a built-in radio and/or is coupled to a radio. Such wireless communication devices 902 and/or access points 906 may operate in accordance with the various aspects of the disclosure as presented herein to enhance performance, reduce costs and/or size, and/or enhance broadband applications. Each wireless communication devices 902 may have the capacity to function as a client node seeking access to resources (e.g., data, and connection to networked nodes such as servers) via one or more access points 906.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 9B:
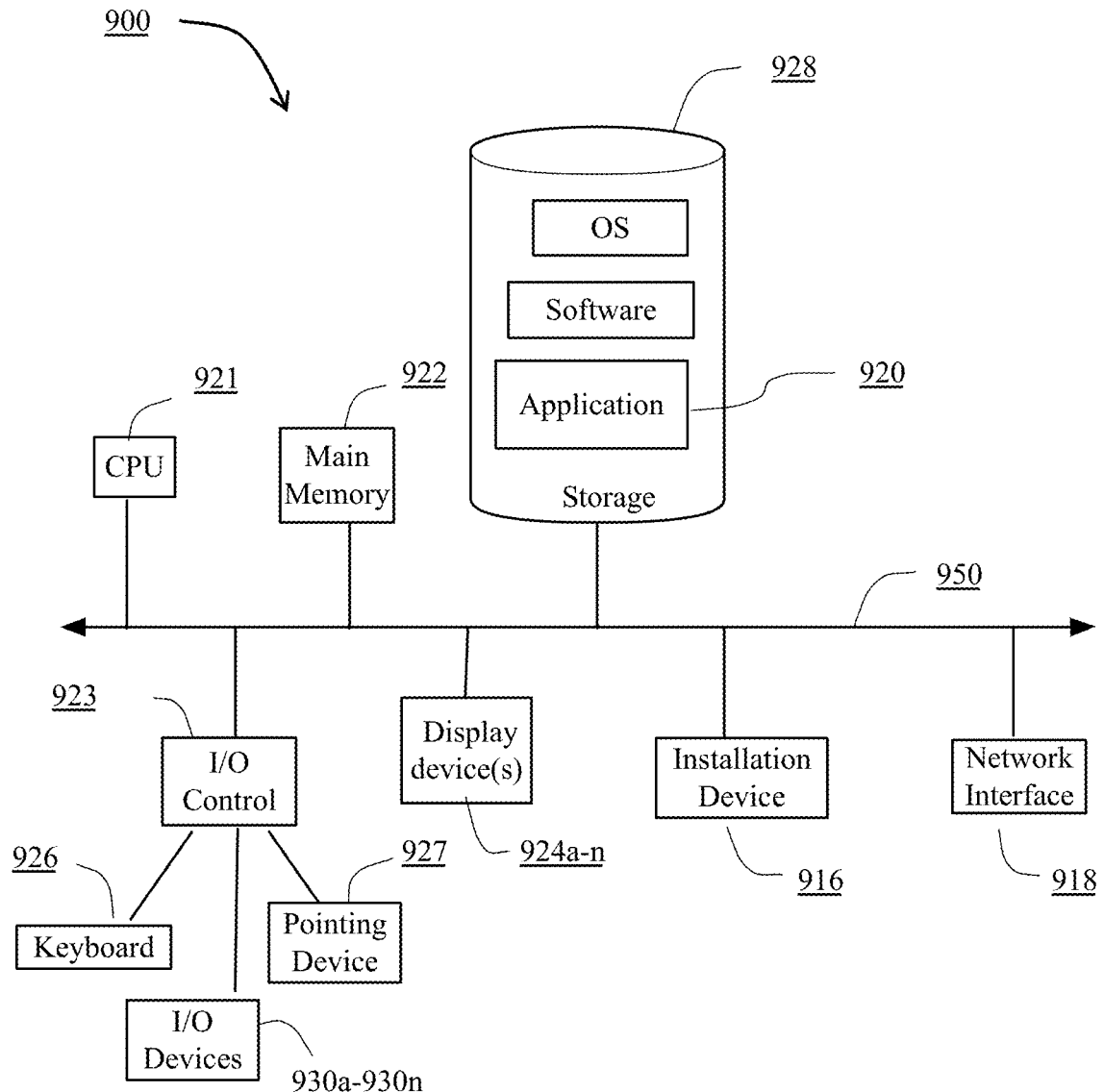
FIGS. 9B and 9C are block diagrams depicting embodiments of computing devices useful in connection with the methods and systems described herein.
Figure 9C:
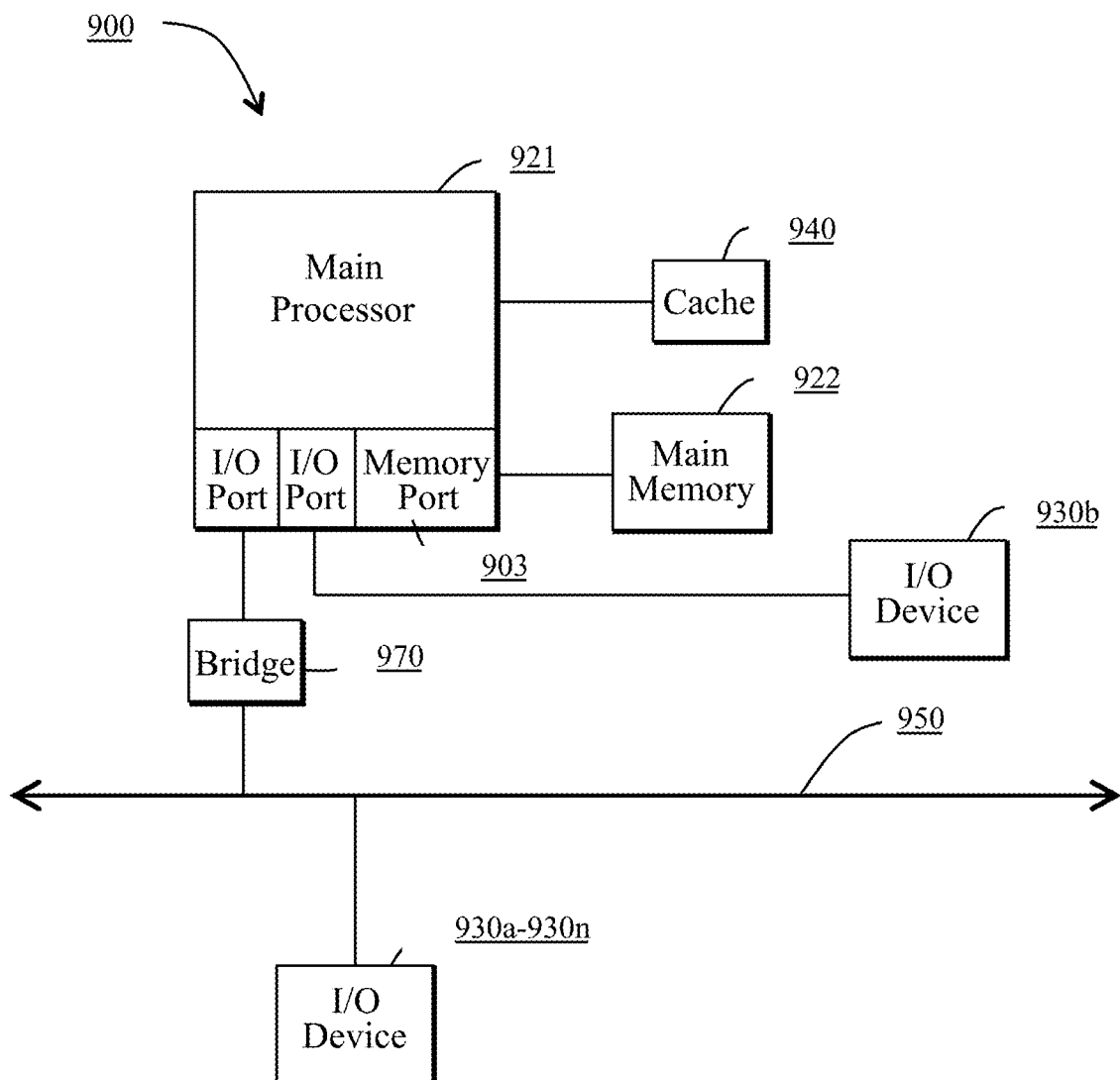

The communications device(s) 902 and access point(s) 906 may be deployed as and/or executed on any type and form of computing device, such as a computer, network device or appliance capable of communicating on any type and form of network and performing the operations described herein. FIGS. 9B and 9C depict block diagrams of a computing device 900 useful for practicing an embodiment of the wireless communication devices 902 or the access point 906. As shown in FIGS. 9B and 9C, each computing point 900 includes a central processing unit 921, and a main memory unit 922. As shown in FIG. 9B, a computing device 900 may include a storage device 928, an installation device 916, a network interface 918, an I/O controller 923, display devices 924a-924n, a keyboard 926 and a pointing device 927, such as a mouse. The storage device 928 may include, without limitation, an operating system and/or software. As shown in FIG. 9C, each computing device 900 may also include additional optional elements, such as a memory port 903, a bridge 970, one or more input/output devices 930a-930n (generally referred to using reference numeral 930), and a cache memory 940 in communication with the central processing unit 921.

The central processing unit 921 is any logic circuitry that responds to and processes instructions fetched from the main memory unit 922. In many embodiments, the central processing unit 921 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 900 may be based on any of these processors, or any other processor capable of operating as described herein.

Main memory unit 922 may be one or more memory chips capable of storing data and allowing any storage location to be directly accessed by the microprocessor 921, such as any type or variant of Static random-access memory (SRAM), Dynamic random-access memory (DRAM), Ferroelectric RAM (FRAM), NAND Flash, NOR Flash and Solid-State Drives (SSD). The main memory 922 may be based on any of the above described memory chips, or any other available memory chips capable of operating as described herein. In the embodiment shown in FIG. 9B, the processor 921 communicates with main memory 922 via a system bus 950 (described in more detail below). FIG. 9C depicts an embodiment of a computing device 900 in which the processor communicates directly with main memory 922 via a memory port 903. For example, in FIG. 9C the main memory 922 may be DRDRAM.

FIG. 9C depicts an embodiment in which the main processor 921 communicates directly with cache memory 940 via a secondary bus, sometimes referred to as a backside bus. In other embodiments, the main processor 921 communicates with cache memory 940 using the system bus 950. Cache memory 940 typically has a faster response time than main memory 922 and is provided by, for example, SRAM, BSRAM, or EDRAM. In the embodiment shown in FIG. 9C, the processor 921 communicates with various I/O devices 930 via a local system bus 950. Various buses may be used to connect the central processing unit 921 to any of the I/O devices 930, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 924, the processor 921 may use an Advanced Graphics Port (AGP) to communicate with the display 924. FIG. 9C depicts an embodiment of a computer 900 in which the main processor 921 may communicate directly with I/O device 930b, for example via HYPERTRANSPORT, RAPIDIO, or INFINIBAND communications technology. FIG. 9C also depicts an embodiment in which local busses and direct communication are mixed: the processor 921 communicates with I/O device 930*a* using a local interconnect bus while communicating with I/O device 930*b* directly.

A wide variety of I/O devices 930*a*-930*n* may be present in the computing device 900. Input devices include keyboards, mice, trackpads, trackballs, microphones, dials, touch pads, touch screen, and drawing tablets. Output devices include video displays, speakers, inkjet printers, laser printers, projectors, and dye-sublimation printers. The I/O devices may be controlled by an I/O controller 923 as shown in FIG. 9B. The I/O controller may control one or more I/O devices such as a keyboard 926 and a pointing device 927, e.g., a mouse or optical pen. Furthermore, an I/O device may also provide storage and/or an installation medium 916 for the computing device 900. In still other embodiments, the computing device 900 may provide USB connections (not shown) to receive handheld USB storage devices such as the USB Flash Drive line of devices manufactured by Twintech Industry, Inc. of Los Alamitos, Calif.

Referring again to FIG. 9B, the computing device 900 may support any suitable installation device 916, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 900 may further include a storage device, such as one or more hard disk drives or redundant arrays of independent disks, for storing an operating system and other related software, and for storing application software programs such as any program or software 920 for implementing (e.g., configured and/or designed for) the systems and methods described herein. Optionally, any of the installation devices 916 could also be used as the storage device. Additionally, the operating system and the software can be run from a bootable medium.

Furthermore, the computing device 900 may include a network interface 918 to interface to the network 904 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 900 communicates with other computing devices 900' via any type and/or form of gateway or tunneling protocol such as Secure Socket Layer (SSL) or Transport Layer Security (TLS). The network interface 918 may include a built-in network adapter, network interface card, PCMCIA network card, card bus network adapter, wireless network adapter, USB network adapter, modem, or any other device suitable for interfacing the computing device 900 to any type of network capable of communication and performing the operations described herein.

In some embodiments, the computing device 900 may include or be connected to one or more display devices 924*a*-924*n*. As such, any of the I/O devices 930*a*-930*n* and/or the I/O controller 923 may include any type and/or form of suitable hardware, software, or combination of hardware and software to support, enable or provide for the connection and use of the display device(s) 924*a*-924*n* by the computing device 900. For example, the computing device 900 may include any type and/or form of video adapter, video card, driver, and/or library to interface, communicate, connect, or otherwise use the display device(s) 924*a*-924*n*. In one embodiment, a video adapter may include multiple connectors to interface to the display device(s) 924*a*-924*n*. In other embodiments, the computing device 900 may include multiple video adapters, with each video adapter connected to the display device(s) 924*a*-924*n*. In some embodiments, any portion of the operating system of the computing device 900 may be configured for using multiple displays 924*a*-924*n*. One ordinarily skilled in the art will recognize and appreciate the various ways and embodiments that a computing device 900 may be configured to have one or more display devices 924*a*-924*n*.

In further embodiments, an I/O device 930 may be a bridge between the system bus 950 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 900 of the sort depicted in FIGS. 9B and 9C may operate under the control of an operating system, which control scheduling of tasks and access to system resources. The computing device 900 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 900 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 900 has sufficient processor power and memory capacity to perform the operations described herein.

In some embodiments, the computing device 900 may have different processors, operating systems, and input devices consistent with the device. For example, in one embodiment, the computing device 900 is a smart phone, mobile device, tablet or personal digital assistant. In still other embodiments, the computing device 900 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 900 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Thus, in one aspect, the present disclosure is directed to a method for flexible channel utilization. The method includes transmitting, by a first wireless device to a second wireless device, a first local channel availability table of the first wireless device. The method also includes receiving, by the first wireless device from the second wireless device, a second local channel availability table of the second wireless device, transmitted responsive to receipt of the first local channel availability table of the first wireless device. The method also includes determining, by the first wireless device, transmission parameters for communications with the second device via the combined first local channel availability table and second local channel availability table; and communicating data between the first wireless device and second wireless device according to the determined transmission parameters from the combined first local channel availability table and second local channel availability table.

In some implementations, the method includes identifying a first intersection between a set of preferred transmission channels of the first wireless device and a set of preferred reception channels of the second wireless device; and a second intersection between a set of preferred reception channels of the first wireless device and a set of preferred transmission channels of the second wireless device. In some implementations, the method includes identifying a first minimum of a duration for which a set of preferred transmission channels of the second wireless device is valid, and a duration for which a set of preferred reception channels of the first wireless device is valid; and identifying a second minimum of a duration for which a set of preferred reception channels of the second wireless device is valid, and a duration for which a set of preferred transmission channels of the first wireless device is valid. In some implementations, the method includes identifying a first minimum of a preferred modulation and coding scheme index for transmissions of the second wireless device, and a preferred modulation and coding scheme index for receptions of the first wireless device; and identifying a second minimum of a preferred modulation and coding scheme index for receptions of the second wireless device, and a preferred modulation and coding scheme index for transmissions of the first wireless device.

In some implementations, the method includes transmitting the first local channel availability in the header of a handshaking request. In some implementations, the method includes subsequently transmitting an updated local channel availability table of the first wireless device. In a further implementation, the method includes transmitting the updated local channel availability table of the first wireless device in response to a ready-to-send message from the second wireless device. In another further implementation, the method includes transmitting the updated local channel availability table of the first wireless device via a control frame.

In some implementations, the method includes calculating, for each subband of a plurality of subbands, a score as a function of the maximum modulation and coding scheme and number of spatial streams supported on said subband, the duration said subband is estimated to be available, and the channel availability or interference seen on said subband; and transmitting the plurality of scores for the plurality of subbands to the second wireless device.

In some implementations, the method includes receiving, by the first wireless device, an updated local channel access table of the second wireless device; determining, by the first wireless device, updated transmission parameters for communications with the second device via the combined first local channel availability table and the updated local channel availability table from the second wireless device; and communicating data between the first wireless device and second wireless device according to the determined updated transmission parameters from the combined first local channel availability table and the updated local channel availability table from the second wireless device.

In another aspect, the present disclosure is directed to a system for flexible channel utilization. The system includes transmission circuitry of a first wireless device configured to transmit a local channel availability table of the first wireless device to a second wireless device. The system also includes reception circuitry of the first wireless device configured to receive a second local channel availability table of the second wireless device, transmitted responsive to receipt of the first local channel availability table of the first wireless device. The system also includes comparator circuitry configured to determine transmission parameters for communications with the second device via the combined first local channel availability table and second local channel availability table. The transmission circuitry and reception circuitry are configured to communicate data between the first wireless device and second wireless device according to the determined transmission parameters from the combined first local channel availability table and second local channel availability table.

In some implementations, the comparator circuitry is configured to determine transmission parameters by identifying a first intersection between a set of preferred transmission channels of the first wireless device and a set of preferred reception channels of the second wireless device; and a second intersection between a set of preferred reception channels of the first wireless device and a set of preferred transmission channels of the second wireless device.

In some implementations, the comparator circuitry is configured to determine transmission parameters by identifying a first minimum of a duration for which a set of preferred transmission channels of the second wireless device is valid, and a duration for which a set of preferred reception channels of the first wireless device is valid; and identifying a second minimum of a duration for which a set of preferred reception channels of the second wireless device is valid, and a duration for which a set of preferred transmission channels of the first wireless device is valid.

In some implementations, the comparator circuitry is configured to determine transmission parameters by identifying a first minimum of a preferred modulation and coding scheme index for transmissions of the second wireless device, and a preferred modulation and coding scheme index for receptions of the first wireless device; and identifying a second minimum of a preferred modulation and coding scheme index for receptions of the second wireless device, and a preferred modulation and coding scheme index for transmissions of the first wireless device.

In some implementations, the transmission circuitry is further configured to transmit the first local channel availability in the header of a handshaking request. In some implementations, the transmission circuitry is further configured to subsequently transmit an updated local channel availability table of the first wireless device. In a further implementation, the transmission circuitry is further configured to transmit the updated local channel availability table of the first wireless device in response to a ready-to-send message from the second wireless device. In another further implementation, the transmission circuitry is further configured to transmit the updated local channel availability table of the first wireless device via a control frame.

In some implementations, the system further comprises a processor configured to calculate, for each subband of a plurality of subbands, a score as a function of the maximum modulation and coding scheme and number of spatial streams supported on said subband, the duration said subband is estimated to be available, and the channel availability or interference seen on said subband; and the transmission circuitry is further configured to transmit the plurality of scores for the plurality of subbands to the second wireless device.

In some implementations, the reception circuitry is further configured to receive an updated local channel access table of the second wireless device; and the comparator circuitry is further configured to determine updated transmission parameters for communications with the second device via the combined first local channel availability table and the updated local channel availability table from the second wireless device, the updated transmission parameters used for communicating data between the first wireless device and second wireless device.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for flexible channel utilization, comprising:
transmission circuitry of a first wireless device configured to transmit a local channel availability table of the first wireless device to a second wireless device;
reception circuitry of the first wireless device configured to receive a second local channel availability table of the second wireless device, transmitted responsive to receipt of the first local channel availability table of the first wireless device;
comparator circuitry configured to determine transmission parameters for communications with the second device via a combination of the first local channel availability table and the second local channel availability table by identifying a first intersection between a set of preferred transmission channels of the first wireless device and a set of preferred reception channels of the second wireless device; and a second intersection between a set of preferred reception channels of the first wireless device and a set of preferred transmission channels of the second wireless device; and
wherein the transmission circuitry and reception circuitry are configured to communicate data between the first wireless device and the second wireless device according to the determined transmission parameters from the combination of the first local channel availability table and the second local channel availability table.

2. The system of claim 1, wherein the transmission circuitry is further configured to transmit the first local channel availability in a header of a handshaking request.

3. The system of claim 1, wherein the transmission circuitry is further configured to subsequently transmit an updated local channel availability table of the first wireless device.

4. The system of claim 3, wherein the transmission circuitry is further configured to transmit the updated local channel availability table of the first wireless device in response to a ready-to-send message from the second wireless device.

5. The system of claim 3, wherein the transmission circuitry is further configured to transmit the updated local channel availability table of the first wireless device via a control frame.

6. The system of claim 1, wherein the system further comprises a processor configured to calculate, for each subband of a plurality of subbands, a score as a function of a maximum modulation and coding scheme and number of spatial streams supported on said subband, a duration said subband is estimated to be available, and a channel availability or interference seen on said subband; and
   wherein the transmission circuitry is further configured to transmit the plurality of scores for the plurality of subbands to the second wireless device.

7. The system of claim 1, wherein the reception circuitry is further configured to receive an updated local channel availability table of the second wireless device;
   and wherein the comparator circuitry is further configured to determine updated transmission parameters for communications with the second device via the combination of the first local channel availability table and the updated local channel availability table from the second wireless device, the updated transmission parameters used for communicating data between the first wireless device and the second wireless device.

8. A system for flexible channel utilization, comprising:
   transmission circuitry of a first wireless device configured to transmit a local channel availability table of the first wireless device to a second wireless device;
   reception circuitry of the first wireless device configured to receive a second local channel availability table of the second wireless device, transmitted responsive to receipt of the first local channel availability table of the first wireless device;
   comparator circuitry configured to determine transmission parameters for communications with the second device via a combination of the first local channel availability table and the second local channel availability table by identifying a first minimum of a duration for which a set of preferred transmission channels of the second wireless device is valid, and a duration for which a set of preferred reception channels of the first wireless device is valid; and identifying a second minimum of a duration for which a set of preferred reception channels of the second wireless device is valid, and a duration for which a set of preferred transmission channels of the first wireless device is valid; and
   wherein the transmission circuitry and reception circuitry are configured to communicate data between the first wireless device and the second wireless device according to the determined transmission parameters from the combination of the first local channel availability table and the second local channel availability table.

9. The system of claim 8, wherein the transmission circuitry is further configured to transmit the first local channel availability in a header of a handshaking request.

10. The system of claim 8, wherein the transmission circuitry is further configured to subsequently transmit an updated local channel availability table of the first wireless device.

11. The system of claim 10, wherein the transmission circuitry is further configured to transmit the updated local channel availability table of the first wireless device in response to a ready-to-send message from the second wireless device.

12. The system of claim 10, wherein the transmission circuitry is further configured to transmit the updated local channel availability table of the first wireless device via a control frame.

13. The system of claim 8, wherein the system further comprises a processor configured to calculate, for each subband of a plurality of subbands, a score as a function of a maximum modulation and coding scheme and number of spatial streams supported on said subband, a duration said subband is estimated to be available, and a channel availability or interference seen on said subband; and
   wherein the transmission circuitry is further configured to transmit the plurality of scores for the plurality of subbands to the second wireless device.

14. The system of claim 8, wherein the reception circuitry is further configured to receive an updated local channel availability table of the second wireless device;
   and wherein the comparator circuitry is further configured to determine updated transmission parameters for communications with the second device via the combination of the first local channel availability table and the updated local channel availability table from the second wireless device, the updated transmission parameters used for communicating data between the first wireless device and the second wireless device.

15. A system for flexible channel utilization, comprising:
   transmission circuitry of a first wireless device configured to transmit a local channel availability table of the first wireless device to a second wireless device;
   reception circuitry of the first wireless device configured to receive a second local channel availability table of the second wireless device, transmitted responsive to receipt of the first local channel availability table of the first wireless device;
   comparator circuitry configured to determine transmission parameters for communications with the second device via a combination of the first local channel availability table and the second local channel availability table by identifying a first minimum of a preferred modulation and coding scheme index for transmissions of the second wireless device, and a preferred modulation and coding scheme index for receptions of the first wireless device; and identifying a second minimum of a preferred modulation and coding scheme index for receptions of the second wireless device, and a preferred modulation and coding scheme index for transmissions of the first wireless device; and
   wherein the transmission circuitry and reception circuitry are configured to communicate data between the first wireless device and the second wireless device according to the determined transmission parameters from the combination of the first local channel availability table and the second local channel availability table.

16. The system of claim 15, wherein the transmission circuitry is further configured to transmit the first local channel availability in a header of a handshaking request.

17. The system of claim 15, wherein the transmission circuitry is further configured to subsequently transmit an updated local channel availability table of the first wireless device.

18. The system of claim 17, wherein the transmission circuitry is further configured to transmit the updated local channel availability table of the first wireless device in response to a ready-to-send message from the second wireless device.

19. The system of claim 15, wherein the system further comprises a processor configured to calculate, for each subband of a plurality of subbands, a score as a function of a maximum modulation and coding scheme and number of spatial streams supported on said subband, a duration said subband is estimated to be available, and a channel availability or interference seen on said subband; and
   wherein the transmission circuitry is further configured to transmit the plurality of scores for the plurality of subbands to the second wireless device.

20. The system of claim 15, wherein the reception circuitry is further configured to receive an updated local channel availability table of the second wireless device;

and wherein the comparator circuitry is further configured to determine updated transmission parameters for communications with the second device via the combination of the first local channel availability table and the updated local channel availability table from the second wireless device, the updated transmission parameters used for communicating data between the first wireless device and the second wireless device.

\* \* \* \* \*